(12) United States Patent
Korin

(10) Patent No.: US 6,739,142 B2
(45) Date of Patent: May 25, 2004

(54) MEMBRANE DESICCATION HEAT PUMP

(76) Inventor: Amos Korin, 16 Mountainview Dr., Weston, CT (US) 06883

( * ) Notice: Subject to any disclaimer, the term of this patent is extended or adjusted under 35 U.S.C. 154(b) by 0 days.

(21) Appl. No.: 10/011,790

(22) Filed: Dec. 4, 2001

(65) Prior Publication Data
US 2002/0096312 A1 Jul. 25, 2002

Related U.S. Application Data
(60) Provisional application No. 60/251,207, filed on Dec. 4, 2000, and provisional application No. 60/257,031, filed on Dec. 21, 2000.

(51) Int. Cl.⁷ .......... F25D 17/06; F25D 23/00; B60H 1/32; F25B 17/08
(52) U.S. Cl. .......... 62/92; 62/93; 62/94; 62/241; 62/244; 62/271; 62/480
(58) Field of Search .......... 62/92, 93, 94, 62/271, 480, 241, 244

(56) References Cited

U.S. PATENT DOCUMENTS

| | | |
|---|---|---|
| 1,872,783 A | 8/1932 | Miller |
| 1,945,441 A | 1/1934 | Miller .......... 62/176 |
| 1,970,301 A | 8/1934 | Frankel .......... 257/9 |
| 2,019,291 A | 10/1935 | Brace et al. .......... 261/11 |
| 2,053,159 A | 9/1936 | Miller .......... 183/49 |
| 2,085,964 A | 7/1937 | Fonda .......... 257/2 |
| 2,089,776 A | 8/1937 | Wittmann .......... 62/129 |
| 2,223,586 A | 12/1940 | Thomas .......... 183/2 |
| 2,700,537 A | 1/1955 | Pennington .......... 261/83 |
| 2,723,837 A | 11/1955 | Pennington .......... 257/3 |
| 2,926,502 A | 3/1960 | Munters et al. .......... 62/94 |
| 2,968,165 A | 1/1961 | Norback .......... 62/94 |
| 3,470,708 A | 10/1969 | Weil et al. .......... 62/271 |
| 3,661,724 A | 5/1972 | Strickler .......... 204/1 T |
| 3,735,558 A | 5/1973 | Skarstrom et al. .......... 55/16 |
| 3,774,374 A | 11/1973 | Dufour et al. .......... 55/316 |

(List continued on next page.)

OTHER PUBLICATIONS

Perry's Chemical Engineering Handbook Sixth Edition, Robert H. Perry, Don W. Green James O. Maloney, McGraw Hill Book Company NY, 1984, pp 12–3 to 12–15.

Chemical Engineering Thermodynamics, Barnett F. Dodge, McGraw Hill Book Company NY, 1944, pp 417 to 423, 446 to 449.

Theory of Heat Pump Operation, Center for Excellence in Absorption Technology/ Heat Pump Theory, Mechanical Engineering, The Ohio State University, 2001.

(List continued on next page.)

*Primary Examiner*—William C. Doerrler
*Assistant Examiner*—Filip Zec
(74) *Attorney, Agent, or Firm*—Ohlandt, Greeley Ruggiero & Perle, LLP

(57) ABSTRACT

There is provided a system for pumping thermal energy. The system includes (a) a membrane permeator for removing vapor from a process gas and for providing a vapor-depleted process gas, and (b) a gas-liquid contactor for adding vapor from a liquid to a vapor-depleted gas to produce a vapor-added process gas. The system transfers a quantity of thermal energy from the liquid to the vapor-added process gas, and is also capable of upgrading the thermal energy to a higher temperature. The system may be used for various heat pump applications including chilling and waste heat or low level heat recovery.

40 Claims, 22 Drawing Sheets

U.S. PATENT DOCUMENTS

| | | | |
|---|---|---|---|
| 4,026,035 A | 5/1977 | Dyer et al. | 34/23 |
| 4,033,141 A | 7/1977 | Gustafsson | 62/238 |
| 4,041,724 A | 8/1977 | Gustafsson | 62/175 |
| 4,077,220 A | 3/1978 | Matthews | 60/641 |
| 4,080,743 A | 3/1978 | Manos | 34/9 |
| 4,100,763 A | 7/1978 | Brody | 62/238 |
| 4,124,177 A | 11/1978 | Timmerman | 237/2 B |
| 4,143,815 A | 3/1979 | Meysenburg | 237/2 B |
| 4,152,901 A | 5/1979 | Munters | 62/112 |
| 4,173,125 A | 11/1979 | Bradshaw | 62/79 |
| 4,175,403 A | 11/1979 | Lunde | 62/324 |
| 4,197,713 A | 4/1980 | Bulang | 62/94 |
| 4,197,714 A | 4/1980 | Bradshaw | 62/94 |
| 4,226,089 A | 10/1980 | Barrow | 62/84 |
| 4,295,282 A | 10/1981 | Fox | 34/27 |
| 4,307,577 A | 12/1981 | Watanabe et al. | 62/238.3 |
| 4,314,601 A | 2/1982 | Giuffre et al. | 165/1 |
| 4,332,139 A | 6/1982 | Fujiwara et al. | 62/101 |
| 4,347,711 A | 9/1982 | Noe et al. | 62/160 |
| 4,350,571 A | 9/1982 | Erickson | 203/21 |
| 4,416,121 A | 11/1983 | Sjostedt et al. | 62/238.6 |
| 4,437,316 A | 3/1984 | Dyer et al. | 62/79 |
| 4,448,347 A | 5/1984 | Dunstan | 237/2 B |
| 4,454,720 A | 6/1984 | Leibowitz | 60/648 |
| 4,467,621 A | 8/1984 | O'Brien | 62/324.1 |
| 4,467,785 A * | 8/1984 | Langford et al. | 126/400 |
| 4,478,057 A | 10/1984 | Lotz | 62/480 |
| 4,517,810 A | 5/1985 | Foley et al. | 62/186 |
| 4,522,035 A | 6/1985 | Dyer et al. | 62/79 |
| 4,523,438 A | 6/1985 | Curti | 62/238.6 |
| 4,537,660 A | 8/1985 | McCord | 202/170 |
| 4,539,816 A | 9/1985 | Fox | 62/87 |
| 4,580,407 A | 4/1986 | Aime et al. | 62/148 |
| 4,594,860 A | 6/1986 | Coellner et al. | 62/271 |
| 4,660,511 A | 4/1987 | Anderson | 122/420 |
| 4,703,629 A | 11/1987 | Moore | 62/235.1 |
| 4,780,967 A | 11/1988 | Mucic | 34/86 |
| 4,786,301 A * | 11/1988 | Rhodes | 62/271 |
| 4,819,446 A | 4/1989 | Moore | 62/238.3 |
| 4,862,708 A | 9/1989 | Basiulis | 62/502 |
| 4,896,515 A | 1/1990 | Endou | 62/498 |
| 4,901,919 A | 2/1990 | Wainwright | 237/81 |
| 4,910,969 A | 3/1990 | Dalin et al. | 62/238.6 |
| 4,930,322 A * | 6/1990 | Ashley et al. | 62/271 |
| 5,002,590 A | 3/1991 | Friesen et al. | 55/16 |
| 5,024,062 A * | 6/1991 | Hellman | 62/92 |
| 5,040,375 A | 8/1991 | Von Dobeln | 62/94 |
| 5,050,391 A | 9/1991 | Tsimerman | 62/94 |
| 5,118,327 A | 6/1992 | Nelson et al. | 55/16 |
| 5,170,633 A | 12/1992 | Kaplan | 62/94 |
| 5,222,375 A * | 6/1993 | Conrad et al. | 62/271 |
| 5,227,027 A | 7/1993 | Topper | 203/10 |
| 5,300,197 A | 4/1994 | Mitani et al. | 202/177 |
| 5,325,676 A | 7/1994 | Meckler | 62/93 |
| 5,353,606 A | 10/1994 | Yoho et al. | 62/271 |
| 5,456,093 A | 10/1995 | Dunne et al. | 62/480 |
| 5,462,110 A | 10/1995 | Sarver | 165/48.1 |
| 5,490,397 A | 2/1996 | Kitamura et al. | 62/474 |
| 5,502,975 A | 4/1996 | Brickley et al. | 62/94 |
| 5,517,828 A | 5/1996 | Calton et al. | 62/271 |
| 5,518,977 A | 5/1996 | Dunne et al. | 502/68 |
| 5,525,143 A | 6/1996 | Morgan et al. | 95/52 |
| 5,528,905 A | 6/1996 | Scarlatti | 62/3.4 |
| 5,535,817 A | 7/1996 | Dunne | 165/104.12 |
| 5,548,958 A | 8/1996 | Lewis | 60/693 |
| 5,551,245 A | 9/1996 | Calton et al. | 62/90 |
| 5,600,968 A | 2/1997 | Jernqvist et al. | 62/484 |
| 5,641,337 A | 6/1997 | Arrowsmith et al. | 95/39 |
| 5,680,711 A | 10/1997 | Moratalla | 34/77 |
| 5,681,433 A | 10/1997 | Friesen et al. | 203/39 |
| 5,732,562 A | 3/1998 | Moratalla | 62/94 |
| 5,768,906 A * | 6/1998 | Tsenter | 62/480 |
| 5,806,323 A * | 9/1998 | Bevier | 62/91 |
| 5,816,065 A | 10/1998 | Maeda | 62/271 |
| 5,843,209 A * | 12/1998 | Ray et al. | 95/52 |
| 5,873,260 A * | 2/1999 | Linhardt et al. | 62/497 |
| 5,937,663 A | 8/1999 | Chen et al. | 62/238.7 |
| 5,941,093 A | 8/1999 | Bengt | 62/478 |
| 5,946,931 A | 9/1999 | Lomax et al. | 62/304 |
| 5,953,926 A | 9/1999 | Dressler et al. | 62/175 |
| 6,004,383 A | 12/1999 | Kuhnelt | 96/8 |
| 6,027,546 A | 2/2000 | Kusters et al. | 95/52 |
| 6,029,467 A | 2/2000 | Moratalla | 62/271 |
| 6,059,857 A * | 5/2000 | Ray et al. | 95/52 |
| 6,070,339 A | 6/2000 | Cunkelman | 34/79 |
| 6,074,972 A | 6/2000 | Bratton et al. | 502/4 |
| 6,083,297 A * | 7/2000 | Valus et al. | 95/44 |
| 6,276,167 B1 | 8/2001 | McCaulley | 62/94 |
| 6,318,106 B1 * | 11/2001 | Maeda | 62/271 |

OTHER PUBLICATIONS

IEA Heat Pump Programme, International Energy Agency Heat Pump Centre, Sittard, The Netherlands, 2000.

Desiccant Cooling Technology Rsource Guide, M. Torrey, J. Westerman, Office of The Secretary of Defence , U.S. Army Construction Research Laboratory, Jan., 2000, pp I–2 tol–24 and II–1 to II–5.

Experimental Evaluation of Commercial Desiccant Dehumidifier Wheel, S.J. Sllayzak, A.A. Pesaran, C.E. Hancock U.S. Department of Energy National Renewable energy Laboratory, Advanced Desiccant Cooling & Dehumidification Program, 1995.

Evaluating the Ability of Unitary Equipment to Maintain Adequate Space Humidity Levels Phase 1 M.J. Brandemuedl, T. Katejanekarn , ASHRAE RP–1121 Final Report Evaluation Plan, Jun. 2001, pp 4–1 to 4–37.

Two–Wheel Desiccant Dehumidification System, federal Technology Alert, Federal Energy Management Program, U.S. Department of Energy, 2000.

Commercial desiccant application guide, chapters 2 and 3, Gas Technology Institute Des Plaines IL 2000, 2001.

Energy Recovery Ventilation—Understanding Energy Wheels and Energy Recovery Ventilation Technology, M. Rbbia G.Dowwse, Carrier Corporation,. Syracuse, NY, 2000.

Separation of Hydrocarbon Vapors from Air, R.D. Behling, K.Ohlrogge, K.V. Peinemann, The Membrane Conference on Technology/Planning, Cambridge, MA Nov., 1988.

Dehydration And Recovery Of Organic Solvents By Pervaporation, H.L. Fleming, BCC Membrane Technology/ Planning Conference, Newton, MA, Oct. 1990.

Volatile organic compound control technology by means of membranes, K. Ohlrogge The Membrane Conference on Technology/Planning, Boston, MA Oct., 1993.

Hybrid Process Opportunities for Organic Vapor Separation by Membranes, V.L. Simmons, R.W. Baker, M.L. Jacobs, J.G. Wijmans, BCC Membrane Conference on Technology/ Planning, Boston, MA Oct. 1993.

New Membrane Applications in Gas Processing, K.A. Lokhandwala, M.L. JacobsMembrane Technology & Research, Inc. Menlo Park, CA, 2000.

Use Membranes for Improved Gas Processing, K.A. Lokhandwala, M. Schurmans, M.L. Jacobs,Membrane Technology & Research, Inc. Menlo Park, CA, 2000.

Low Pressure Air Drying, Air Product and Chemicals, 1996.

HMD Series Membrane Compressed Air Dryer, Hankinson International Desiccant & Membrane Dryers, 2000.

Low–Pressure Air Dehydration Membrane Function, Howell Laboratories, Inc., Bridgton MN, 2001.

Perma Pure Mini–Dryers, Bulletins 105,106, Perma Pure Products, Inc., Tom River NJ, 1987.

An Experimental Evaluation of a Novel Full–Scale Evaporatively Cooled Condenser, Y. Hwang, R. Radermacher, Project Summary, EPA/600/SR–97/079, Nov. 1997.

Desiccant Augmented Evaporative Cooling: An Emerging Air–Conditioning Alternative, S. Jain Department of Mechanical Engineering, Indian Institute of Technology Delhi, NewDelhi, India, 2001.

A Novel Air Conditioning System, H.T. El–Dessouky, H.M. Ettouney, W. Bouhamra, Trans IChemE, vol. 78, Part A, Oct. 2000.

Novel Heat pump System Exploit Ambient Energy, Cadet IEA, OECD Renewable Energy, Technical Brochure No. 85.

Evaluation of an Absorption Heat Pump to Mitigate Plant Capacity Reduction Due to Ambient Temperature Rise for an Air–Cooled Ammonia and Water Cycle, D. Bharathan and G. Nix, National Renewable Energy Laboratory, U.S. Department of Energy NREL/6P–550–3012, Jul. 2001.

Dual–Path Heat Pump System Used in Superstore, Cadet IEA, OECD Renewable Energy, Result 369 US 99.530/3B.HO3, 1999.

Energy Savings from Dual–Source Heat Pump Technology, Federal Energy Management Program, DOE/EE–0220, 1999.

Analysis of Geothermal Heat Pump Manufacturers Survey Data, P. Hofihan, Renewable Energy Annual, Energy Information Administration, 1998.

Energy and Demand Study of Heating and Cooling Equipment, S. Kavanaugh,. University of Alabama, Tuscaloosa, AL, 1992.

Ground–Coupling with Water–Source Heat Pumps, S. Kavanaugh, The University of Alabama, Tuscaloosa, AL. 1992.

Geothermal Heat Pumps—Trends and Comparisons, J.W. Lund, Geo–Heat Center Quarterly Bulletin, Vol 12, No. 1, Geo–Heat Center, Oregon Institute of Technology, Klamath Falls, OR, 1989.

Groundwater Heat Pump Systems: Experience at Two High Schools, K. Rafferty, AT–96–15–3, ASHRAE Transactions Vol #102, Part 1, 1996.

Geothermal Heat Pumps Deliver Big Savings for Federal Facilities, An update on geothermal heat pump technologies and the Super ESPC, Federal Energy Management Program, 2000.

Heat Recovery from Wastewater Using a Gravity–Film Heat Exchanger, DOE/EE–0247 Federal Energy Management Program, 2000.

* cited by examiner

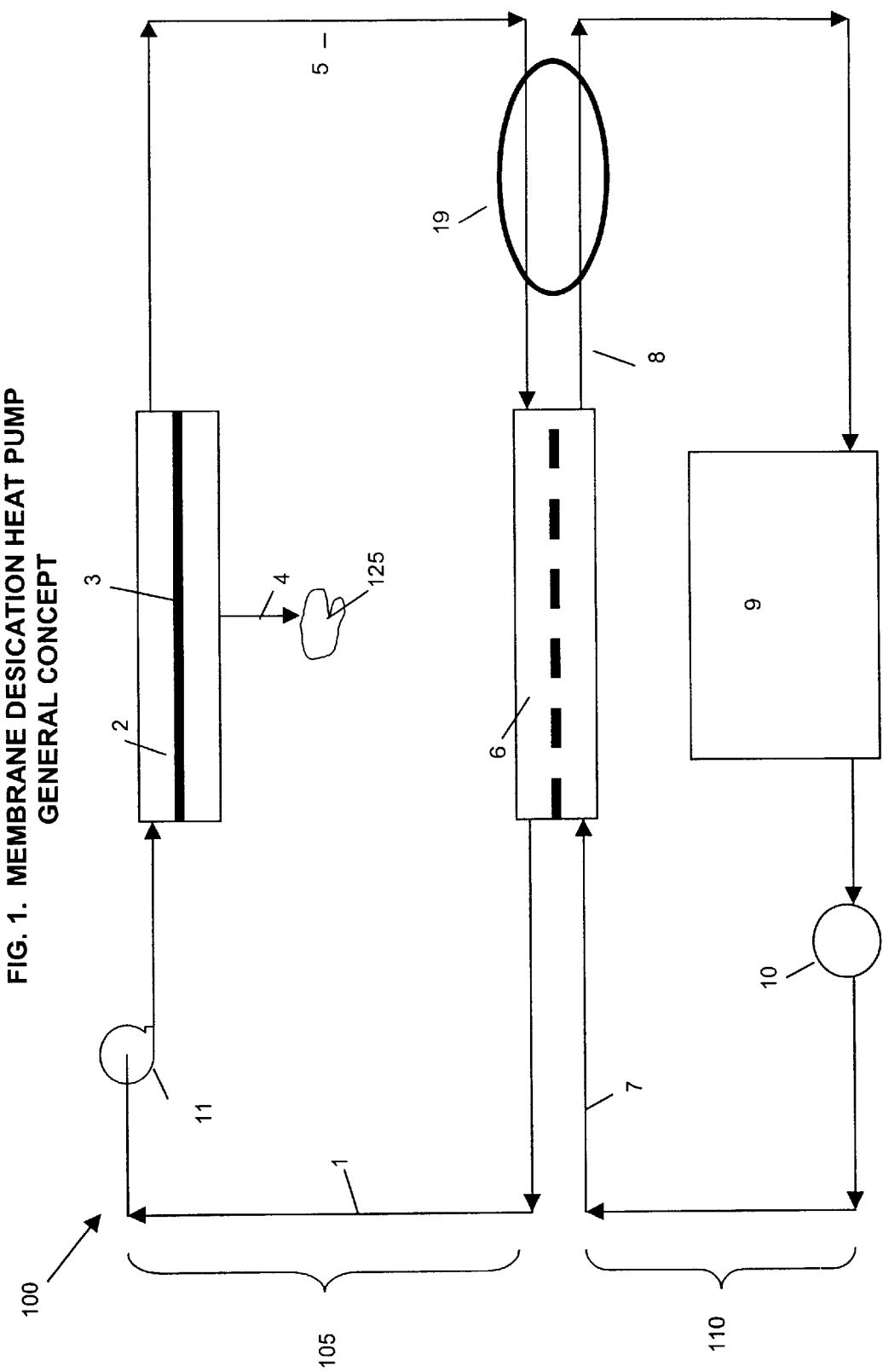
FIG. 1. MEMBRANE DESICATION HEAT PUMP
GENERAL CONCEPT

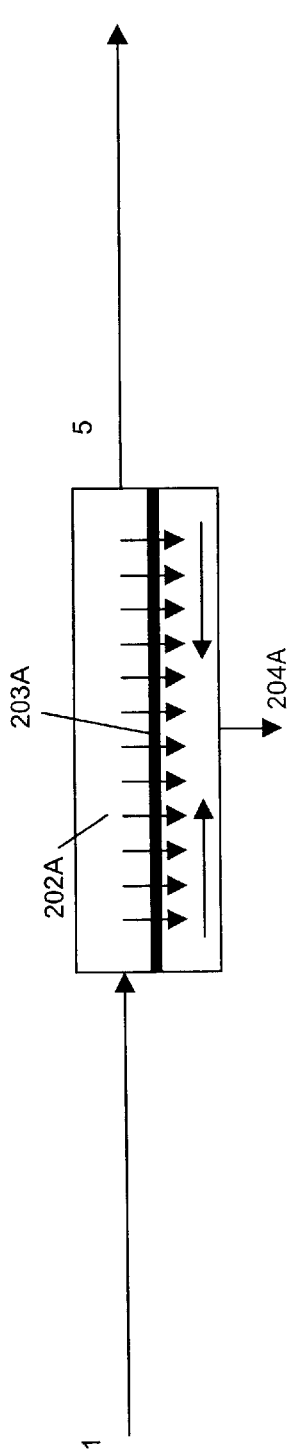
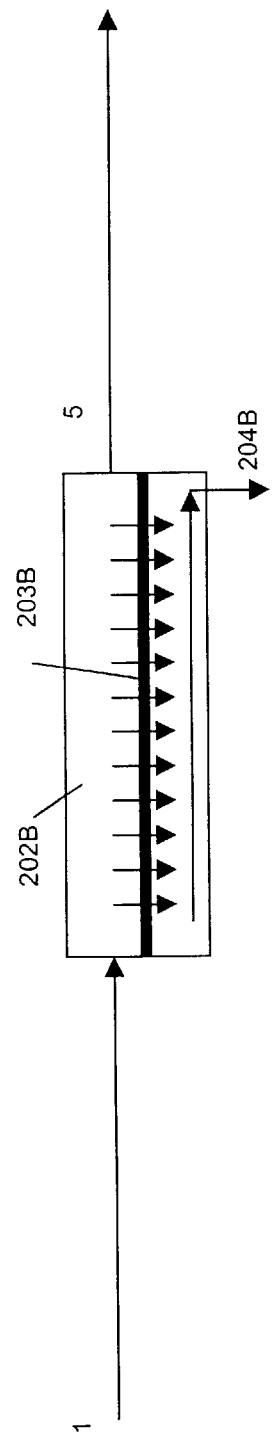
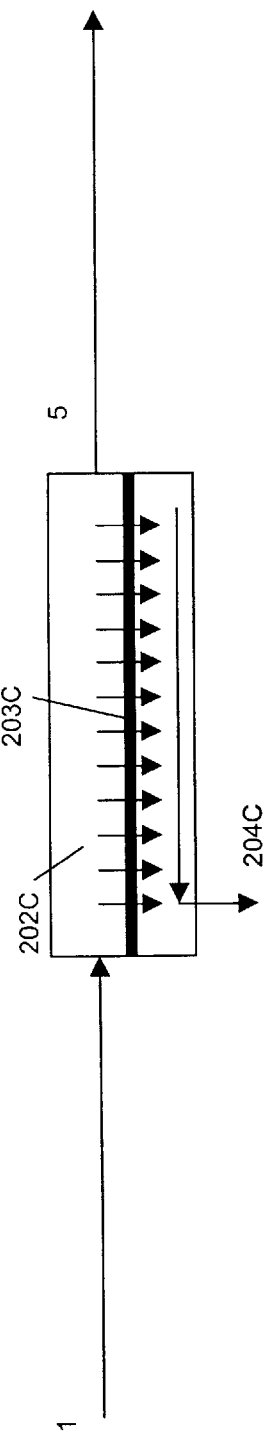

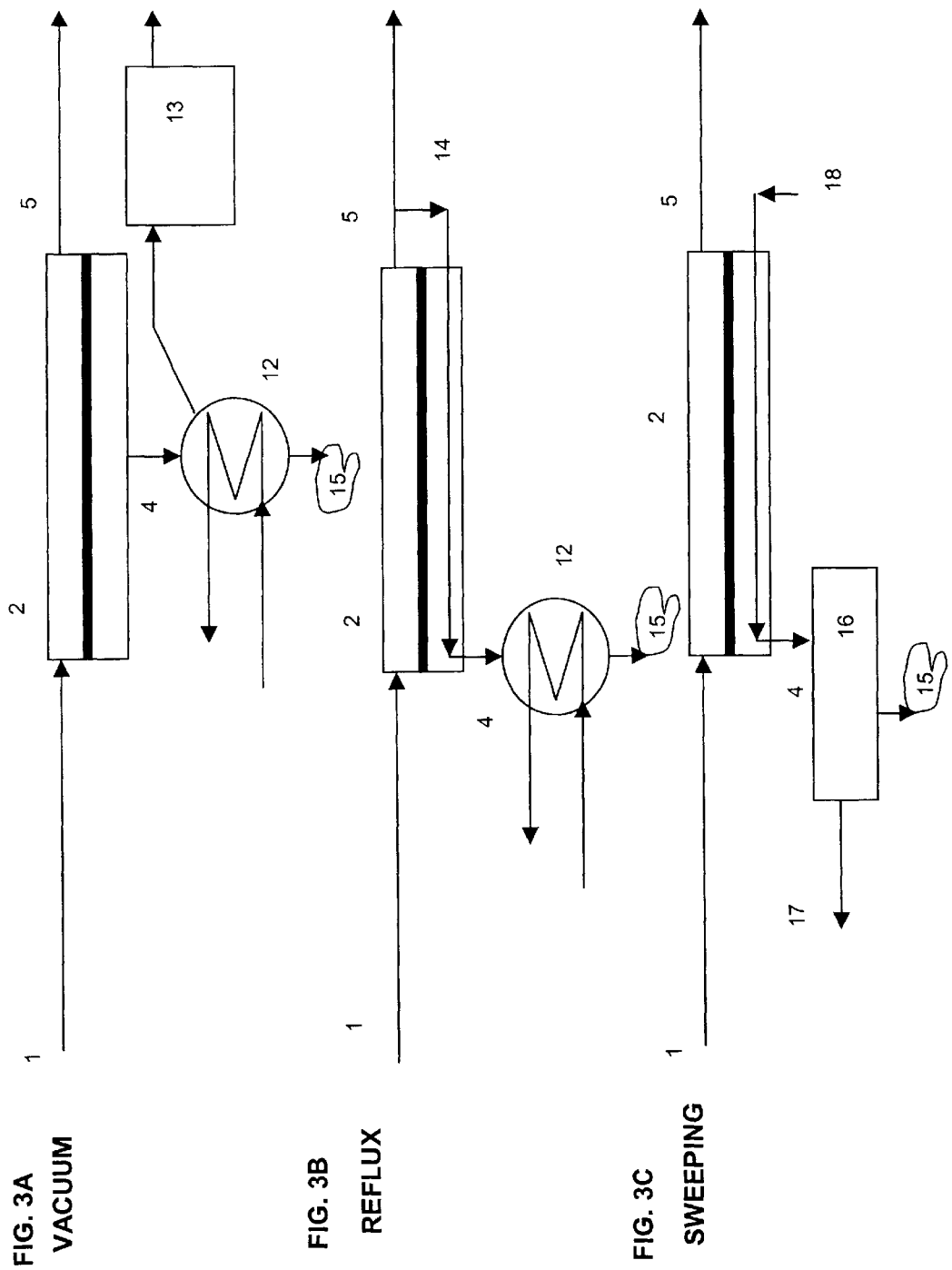
FIG. 3A VACUUM
FIG. 3B REFLUX
FIG. 3C SWEEPING

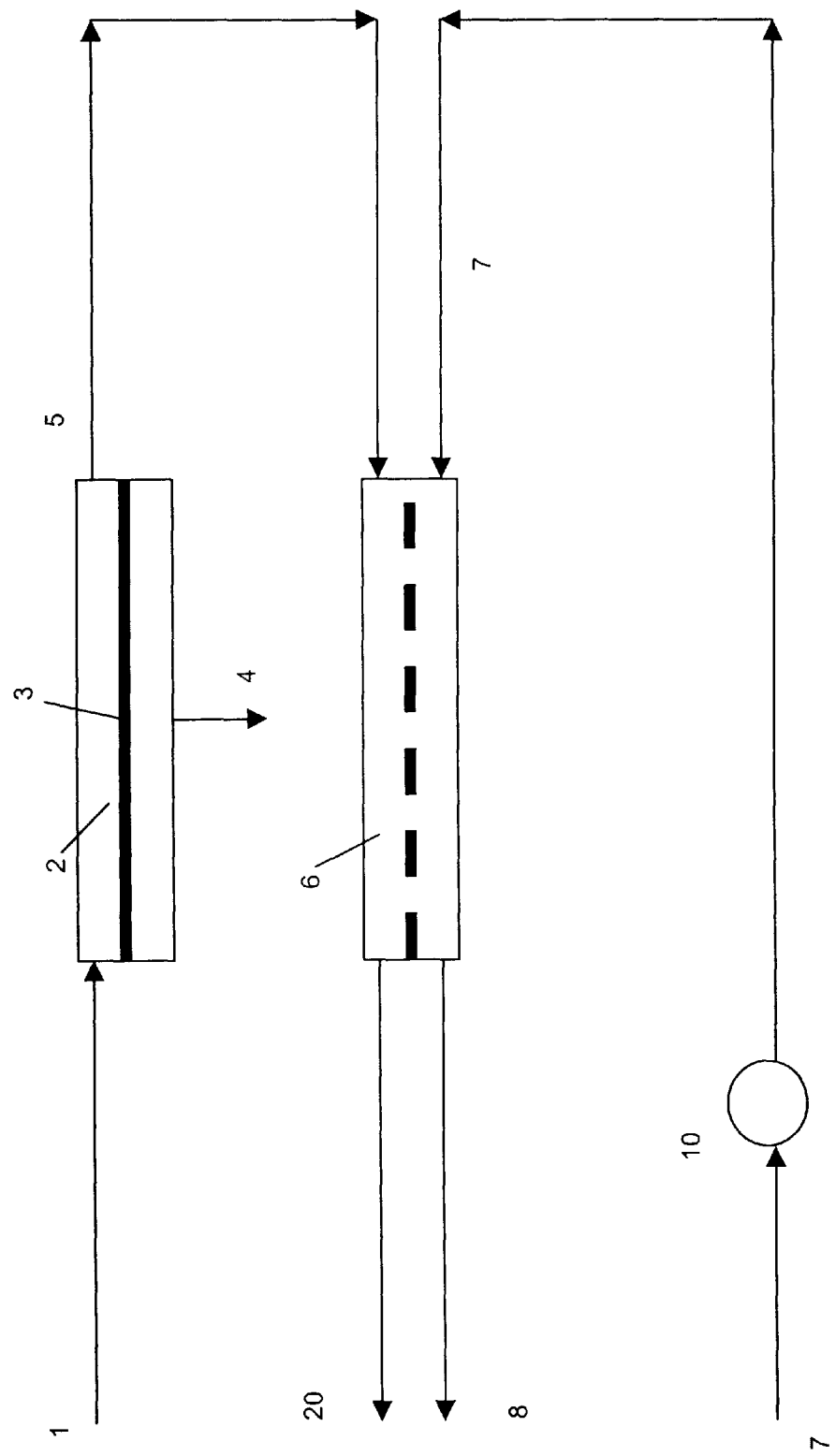

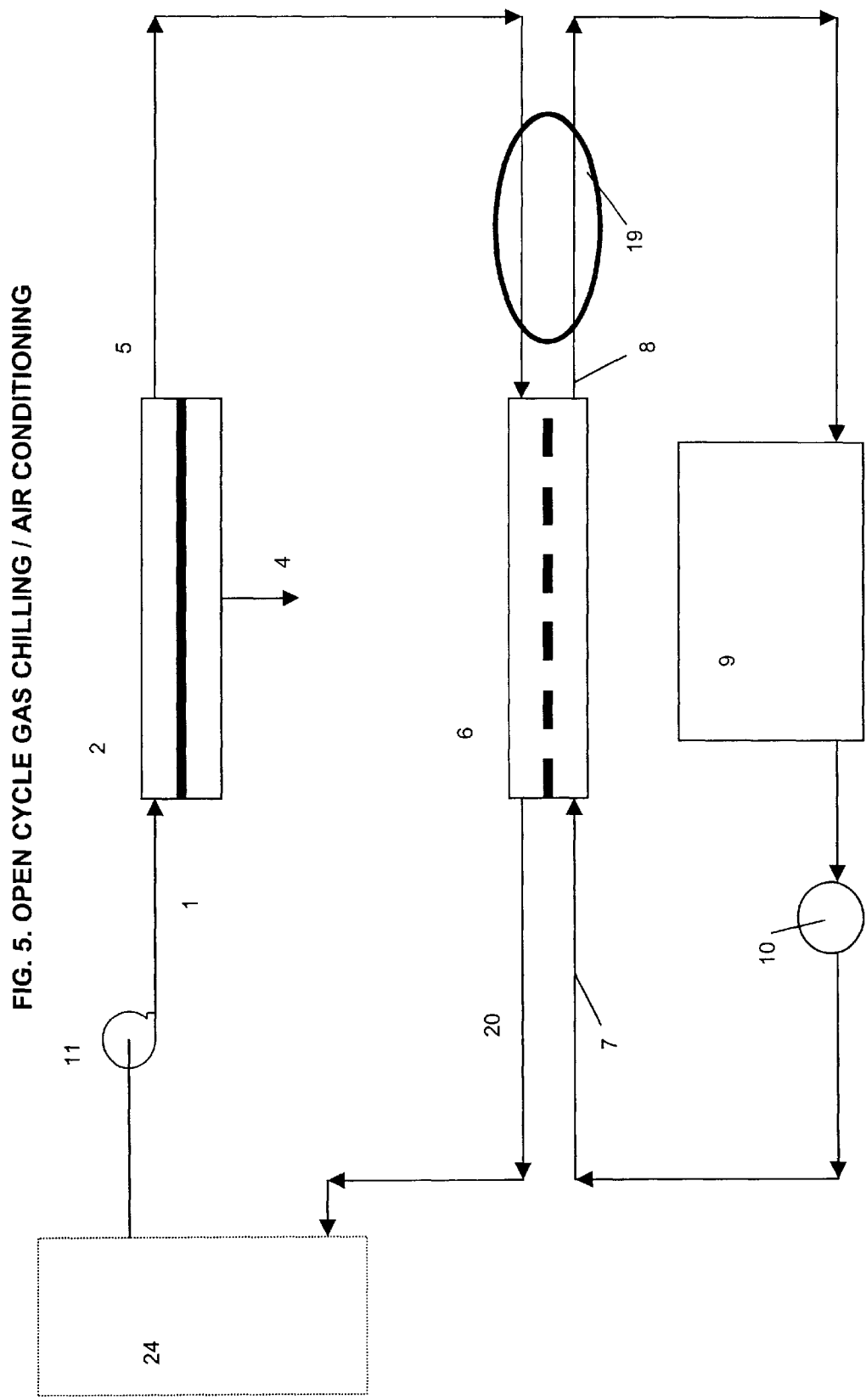

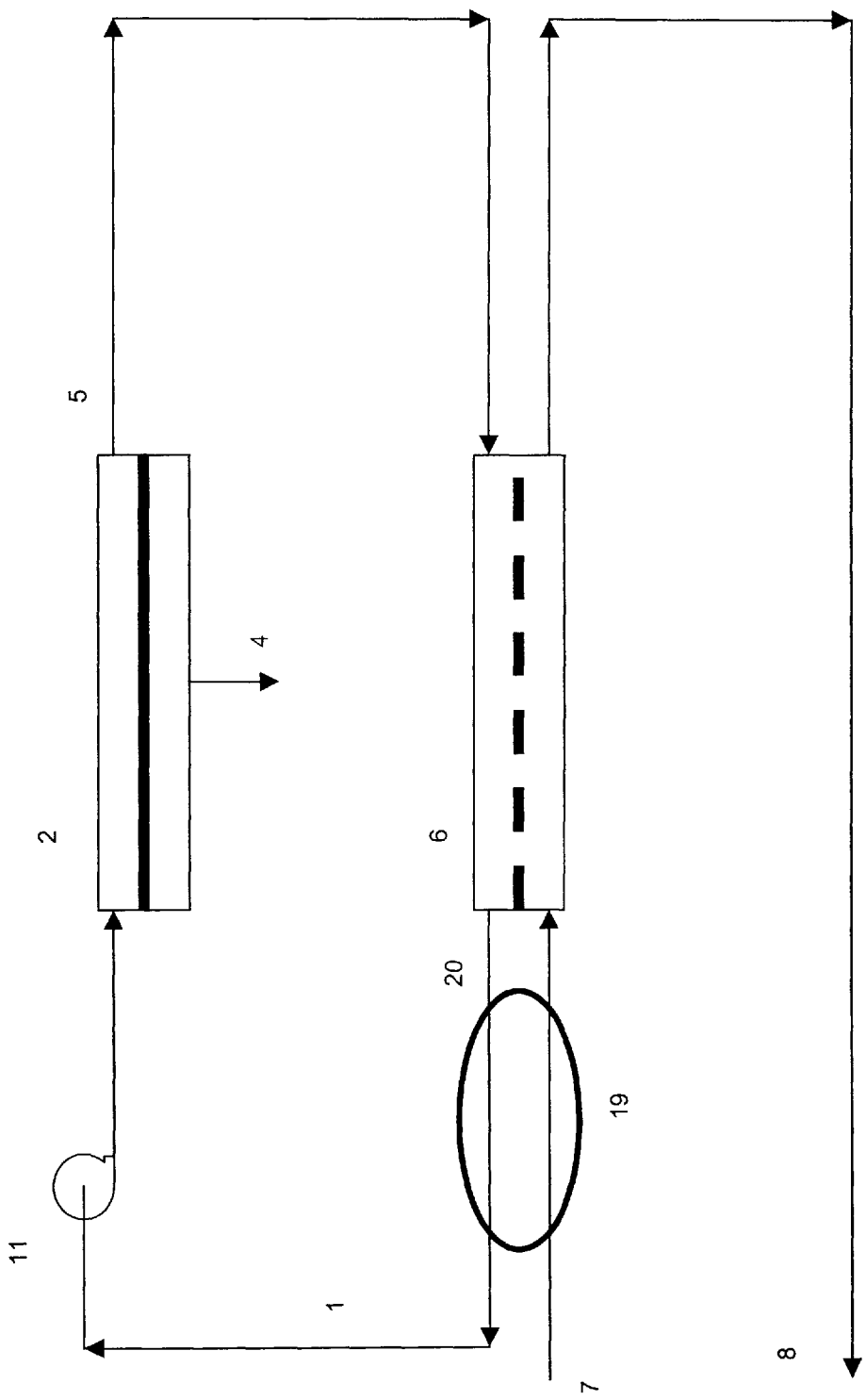
FIG. 6. LIQUID CHILLING - OPEN CYCLE

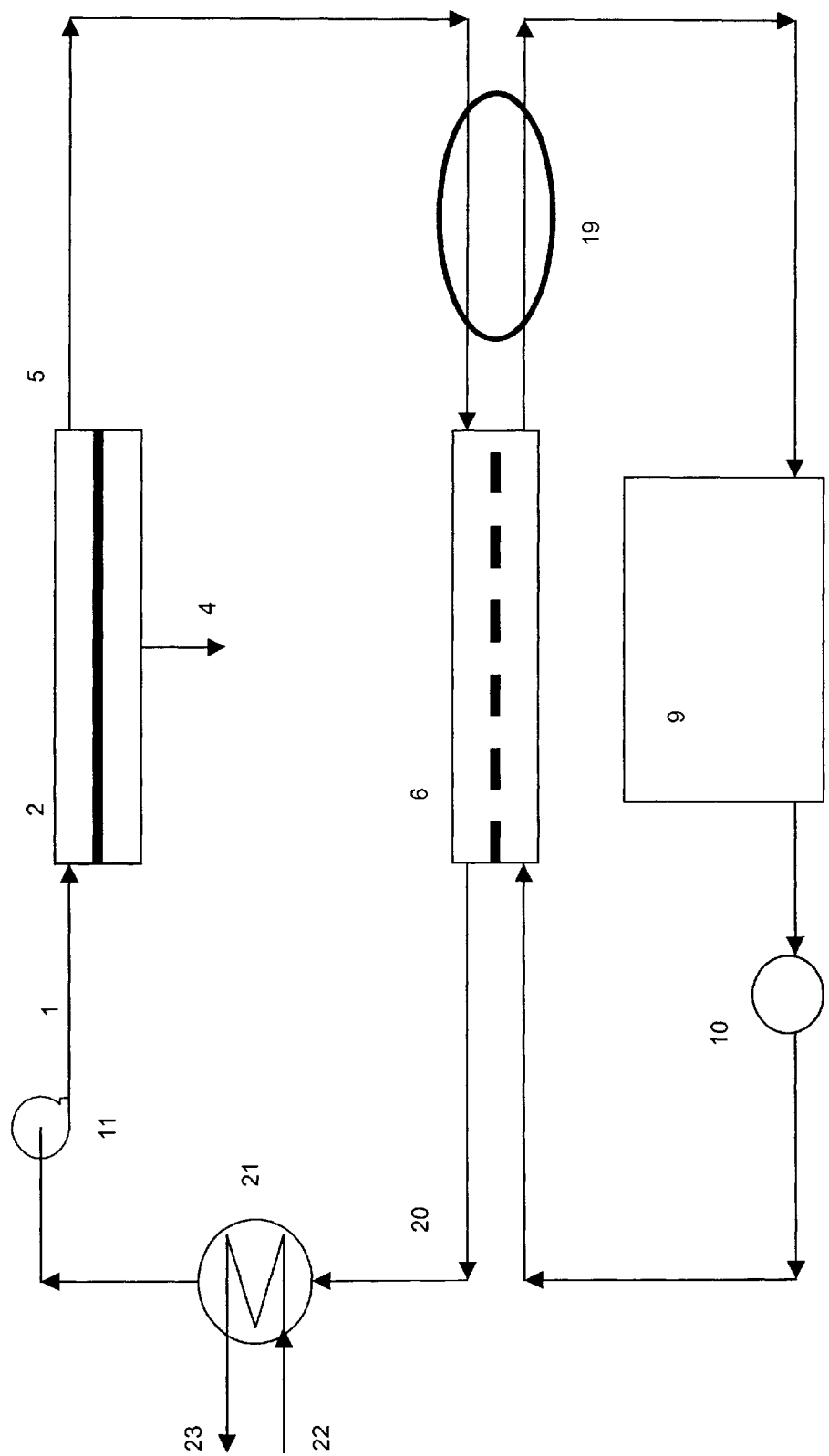
FIG. 7. GAS CHILLING - CLOSED CYCLE

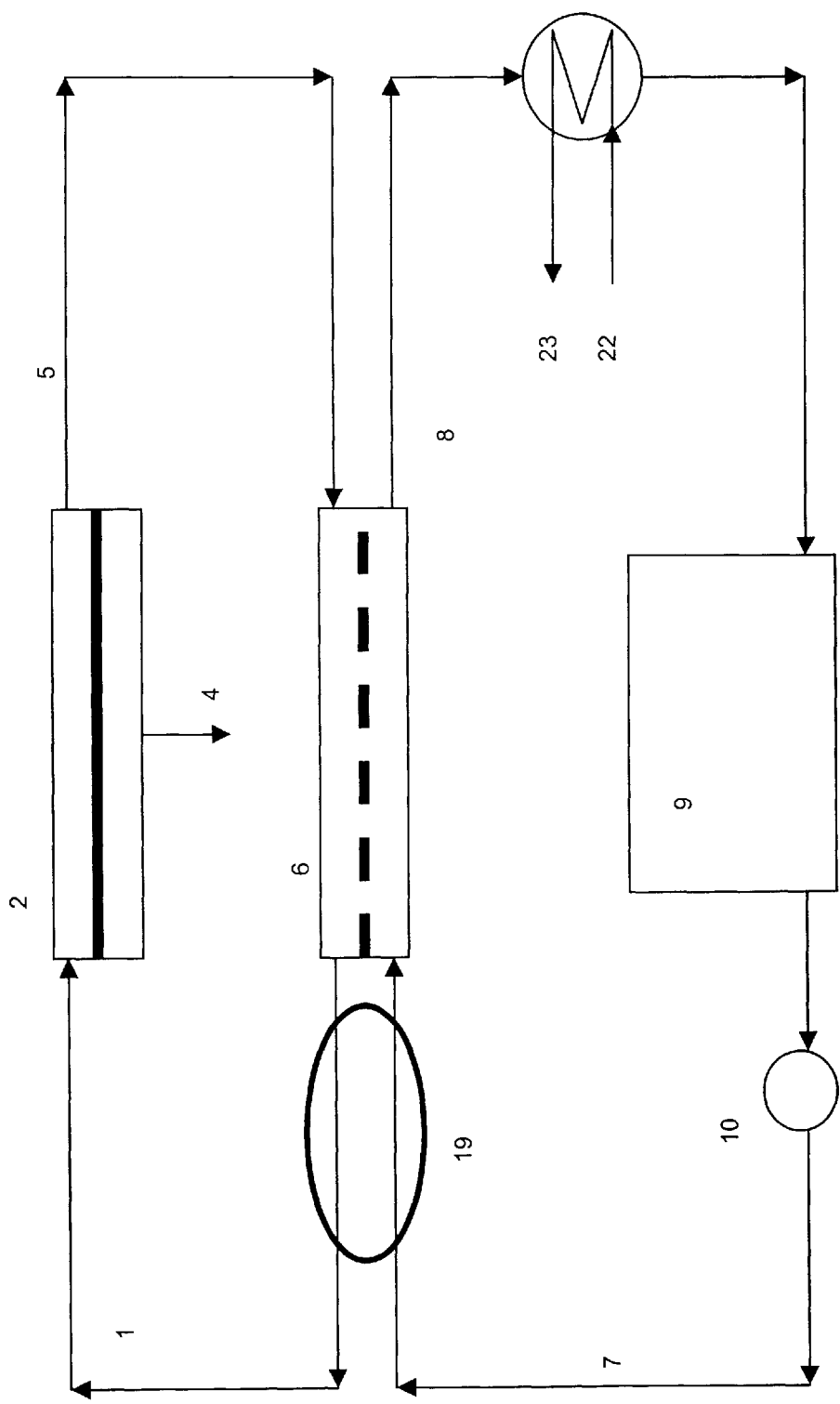
FIG. 8. CLOSED CYCLE LIQUID CHILLING

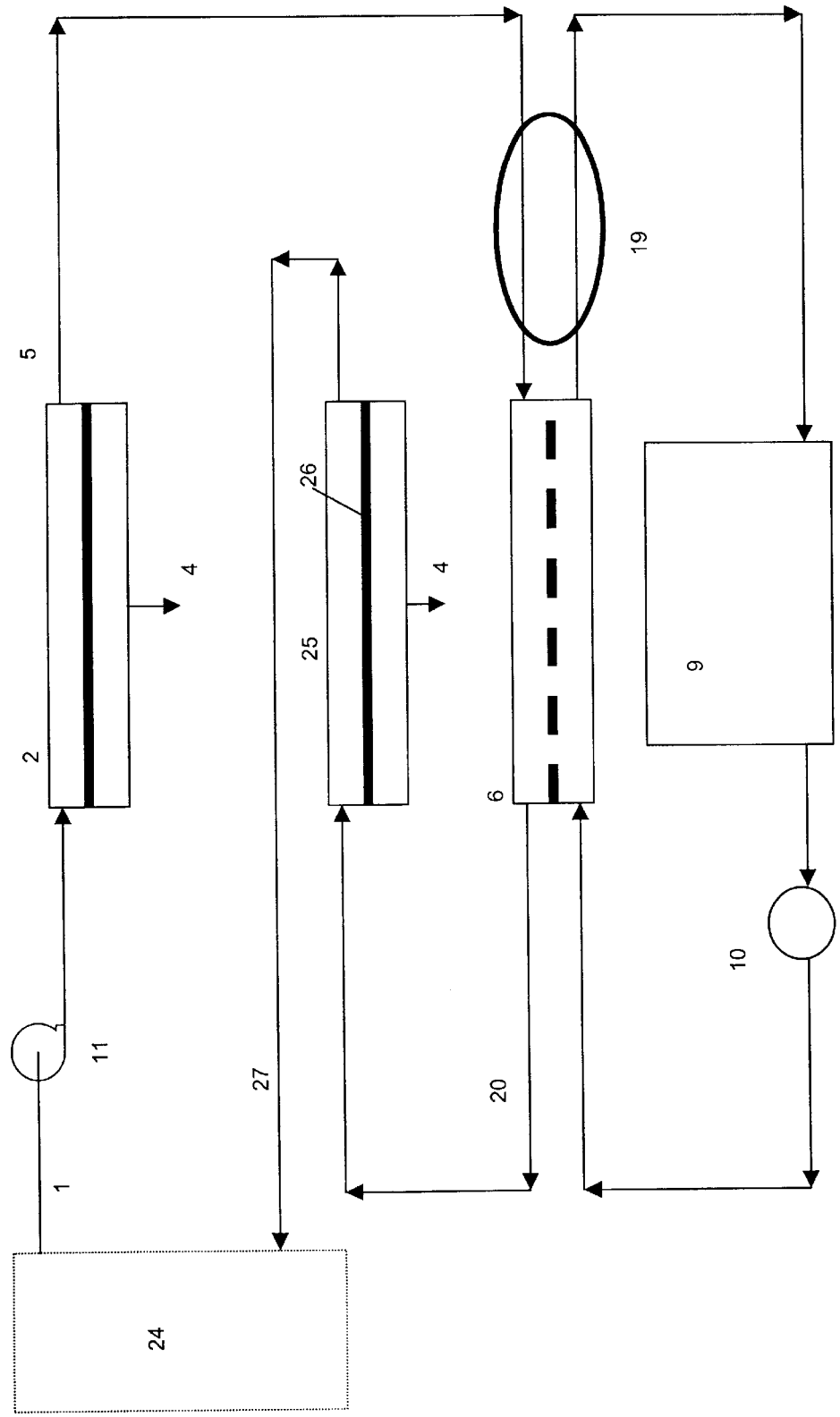
FIG. 9. GAS CHILLING/AIR CONDITIONING + VAPOR CONTENT CONTROL

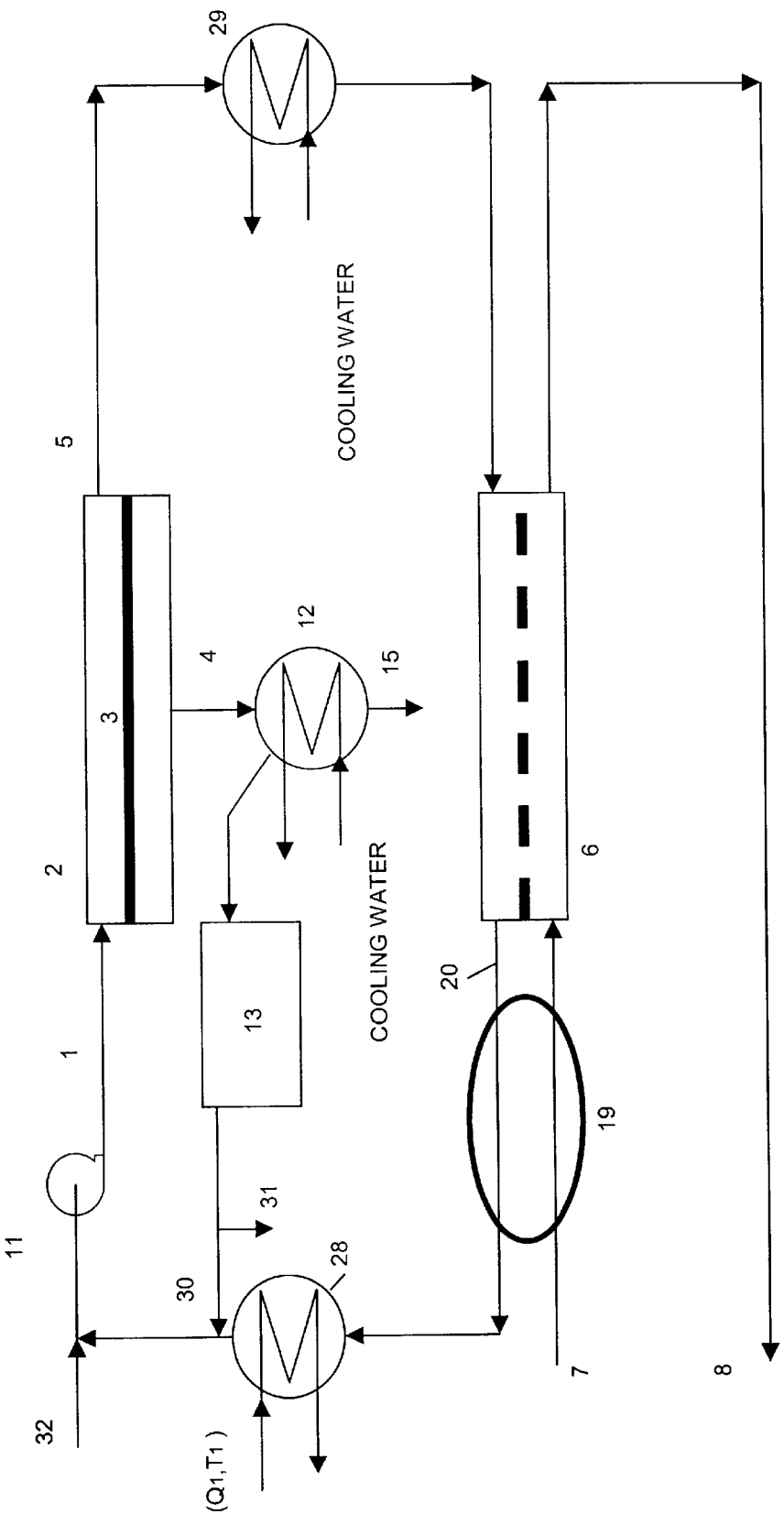
FIG. 10. LIQUID CHILLING - OPEN CYCLE Q IN

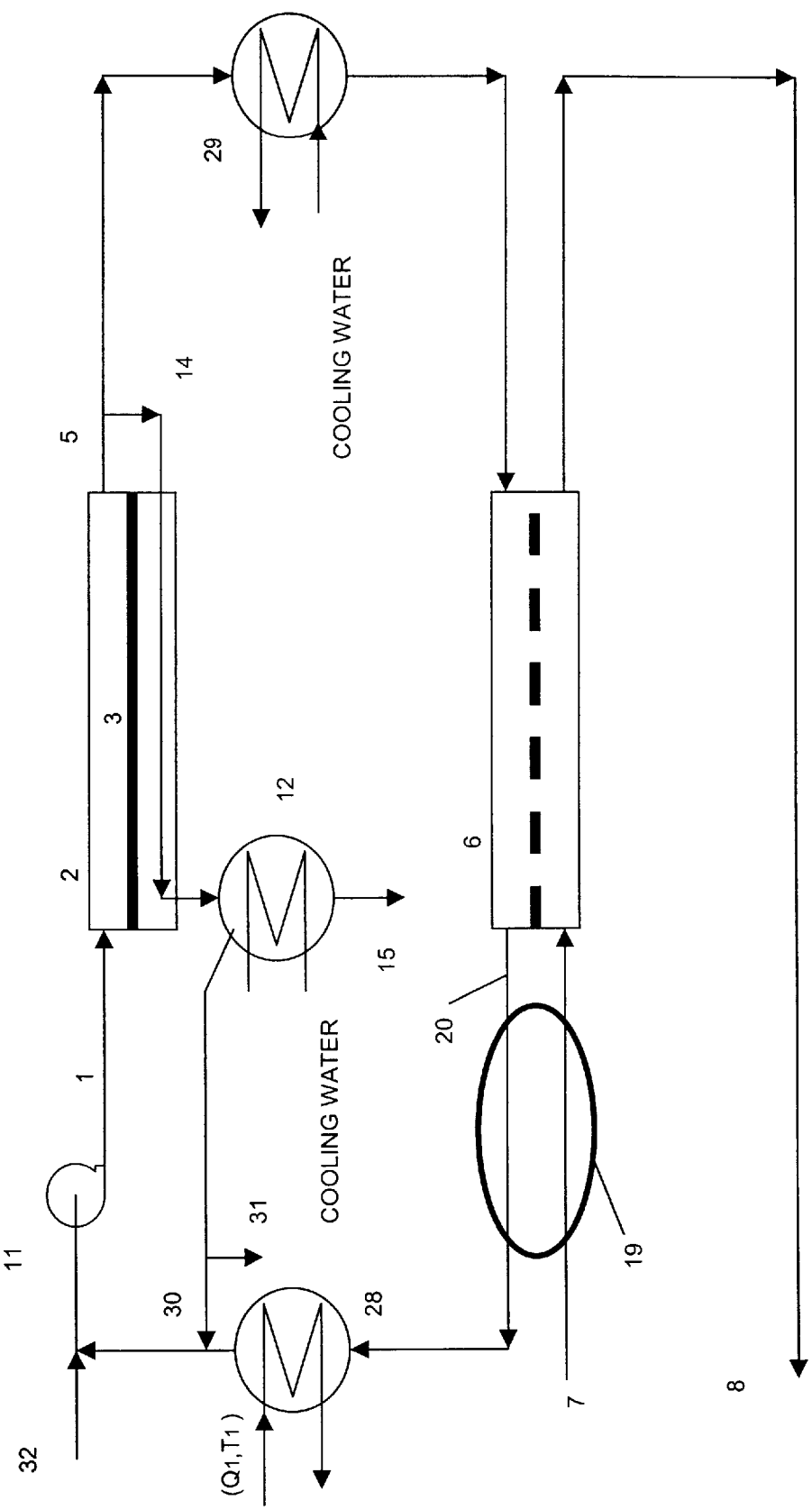
FIG. 11. LIQUID CHILLING - OPEN CYCLE + REFLUX

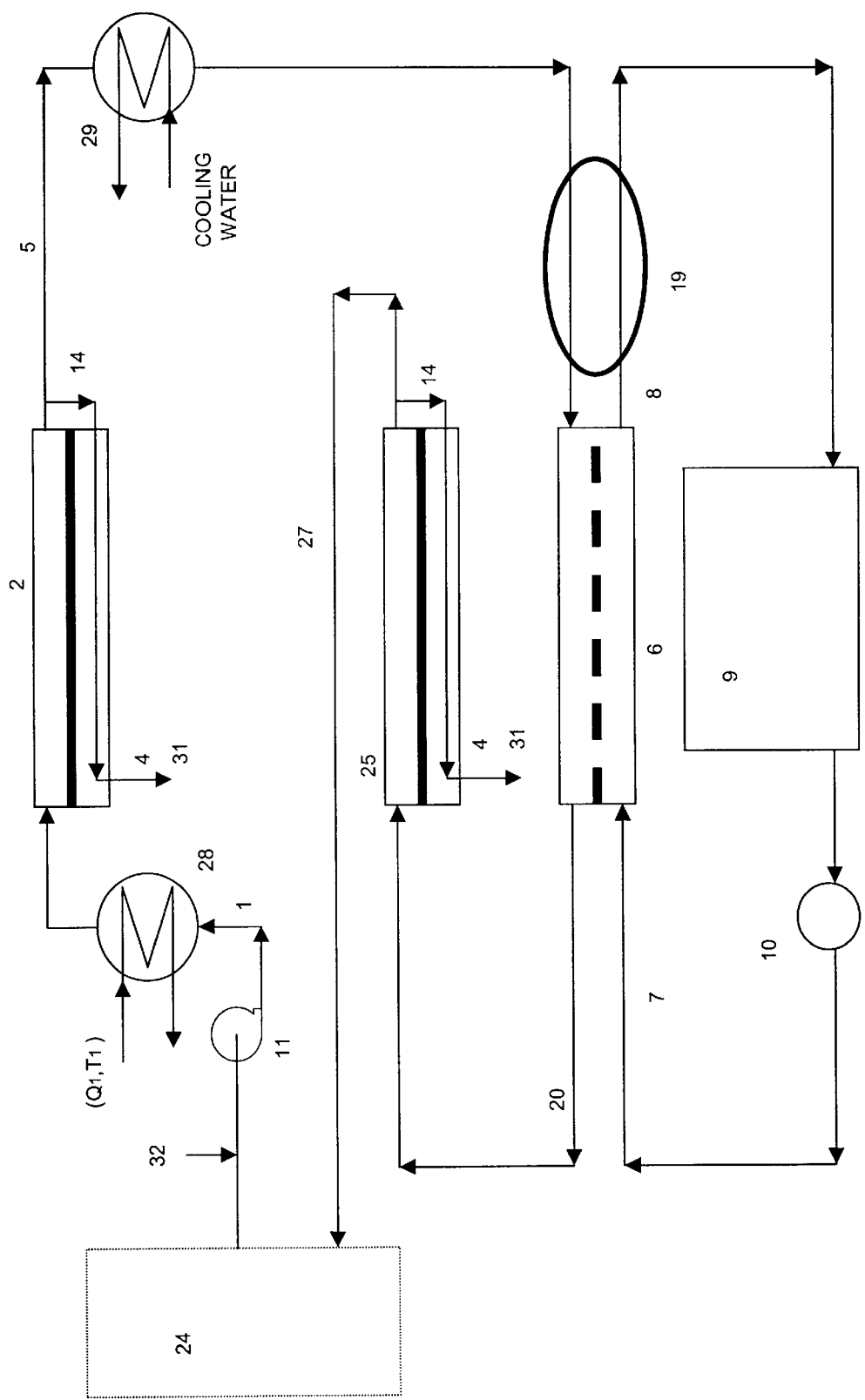
FIG. 12. AIR CONDITIONING - DETAILED

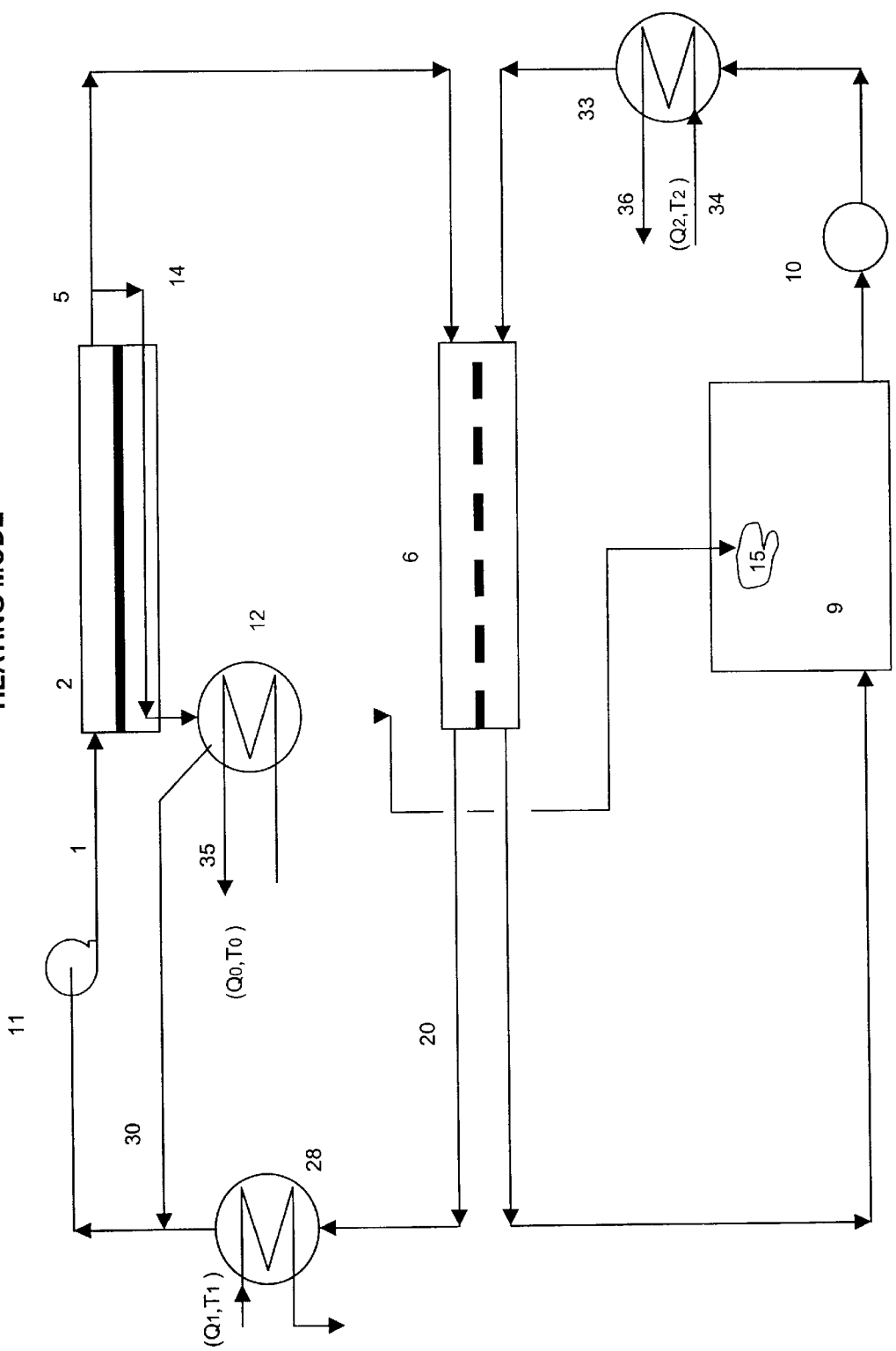
FIG. 13. MEMBRANE HEAT PUMP HEATING MODE

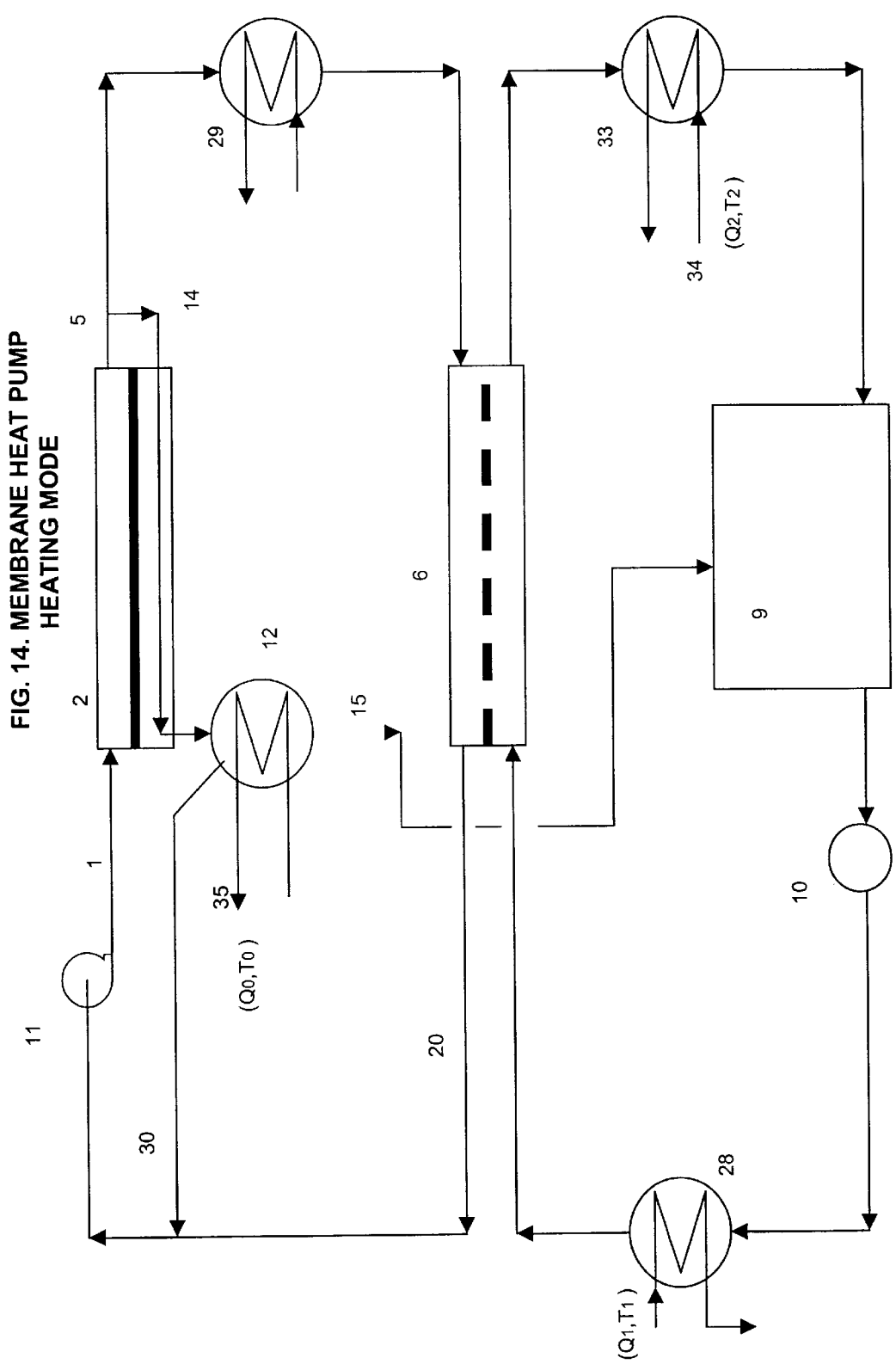
FIG. 14. MEMBRANE HEAT PUMP HEATING MODE

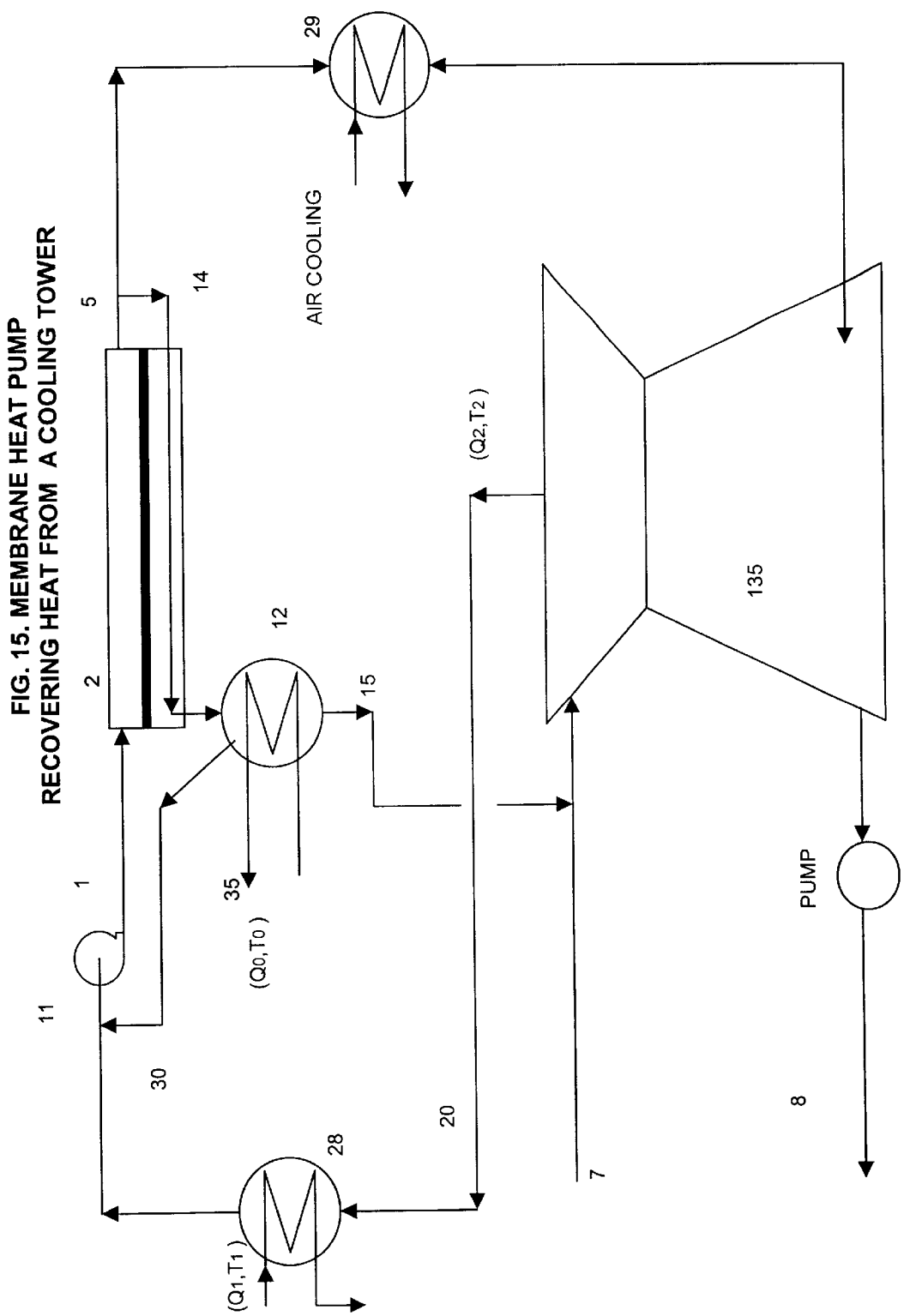
FIG. 15. MEMBRANE HEAT PUMP RECOVERING HEAT FROM A COOLING TOWER

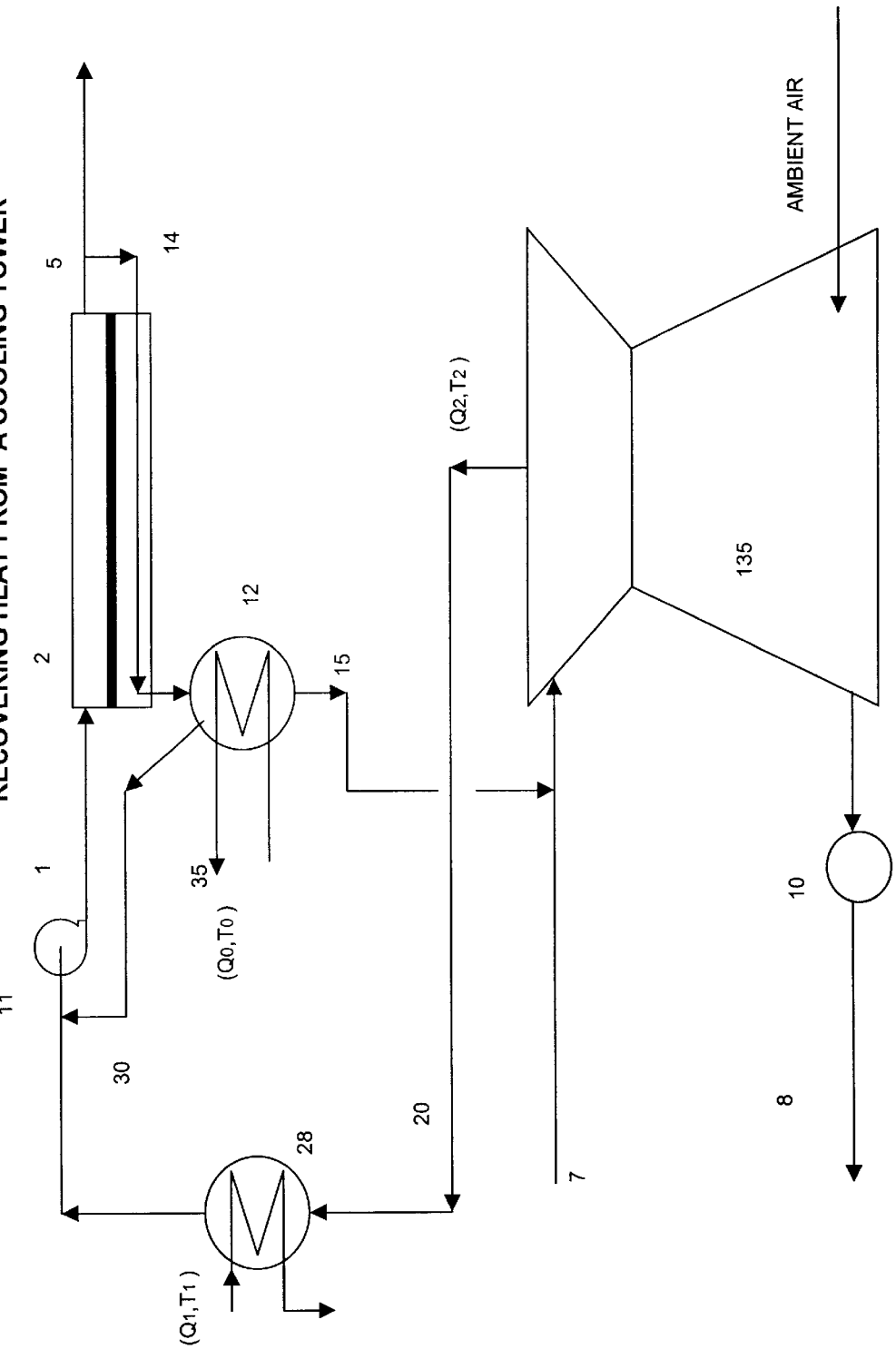

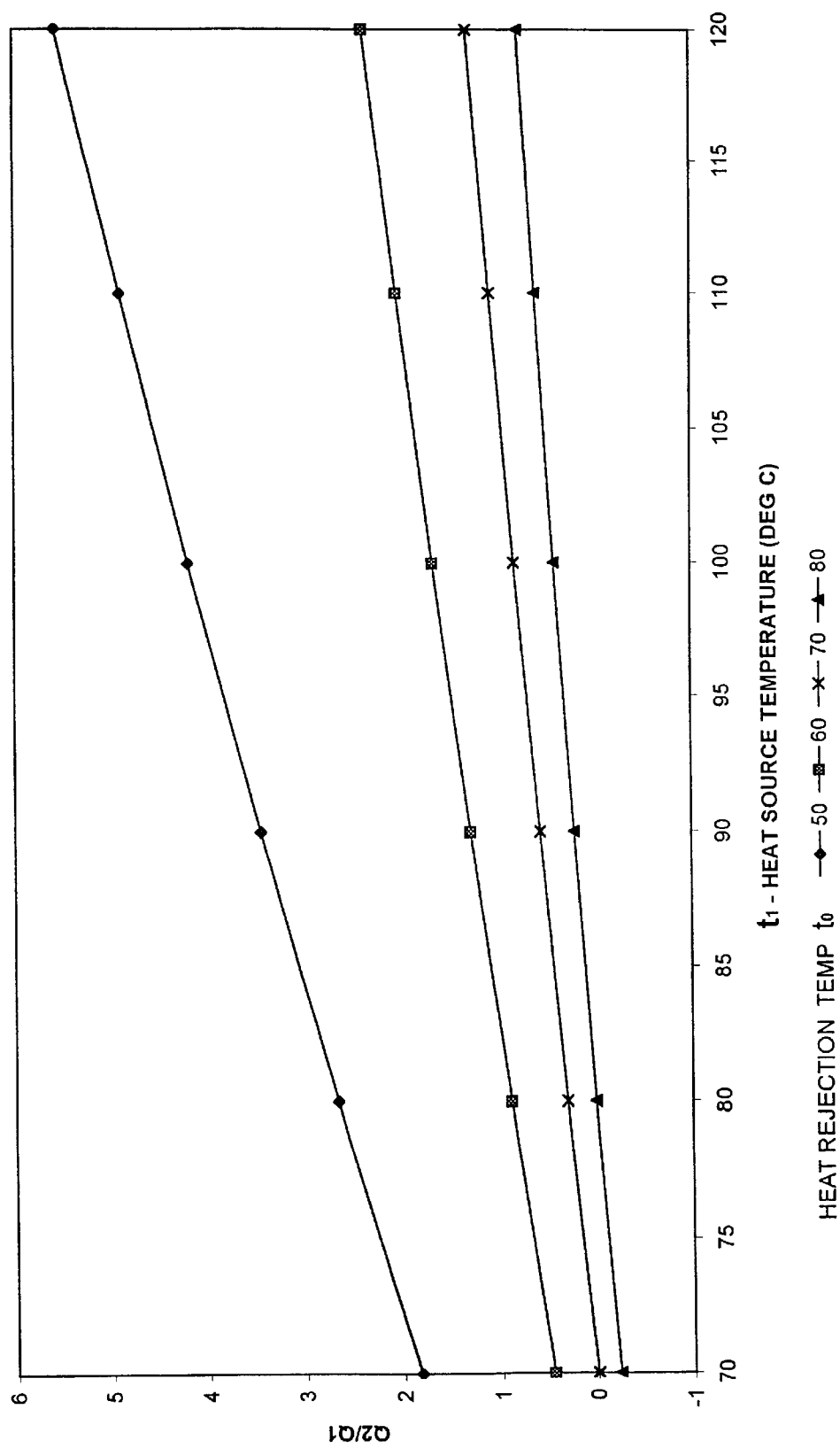

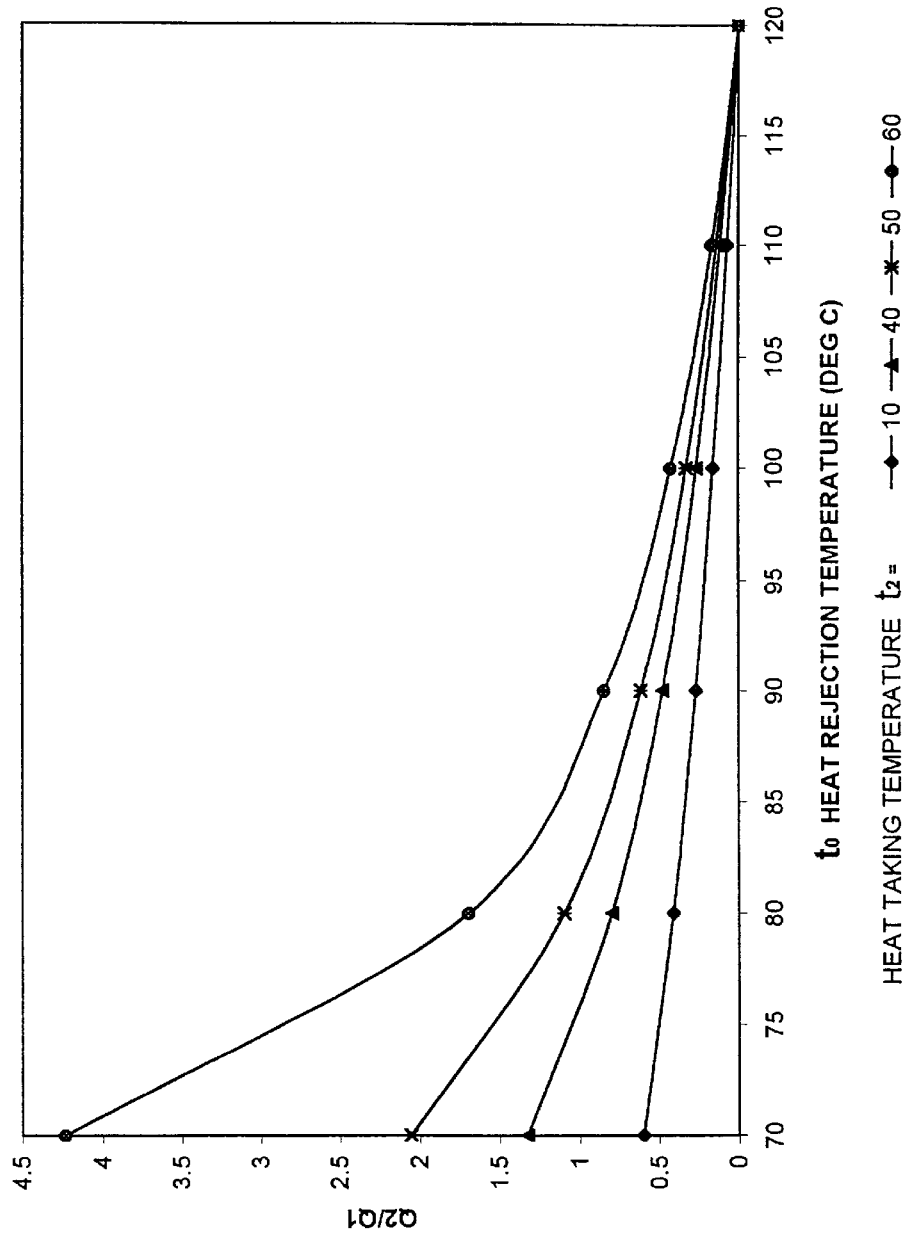

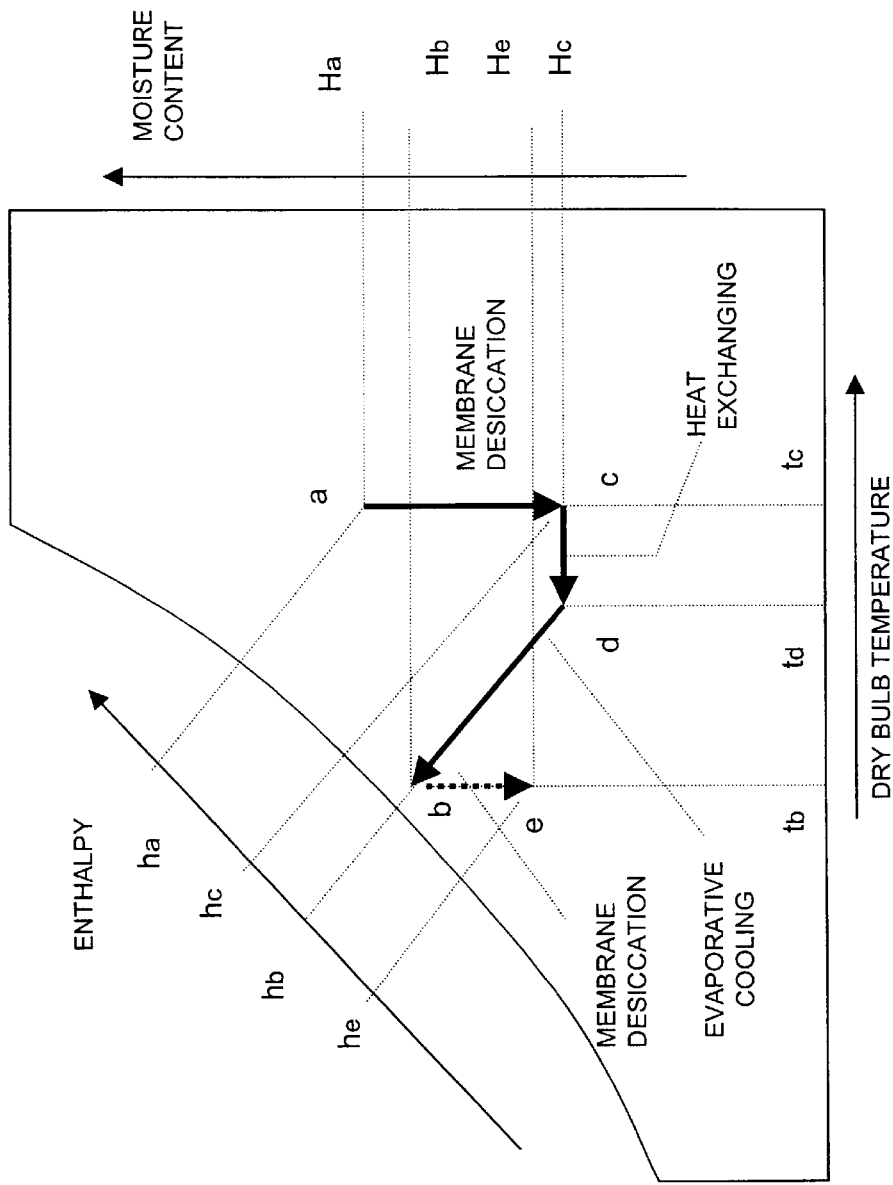

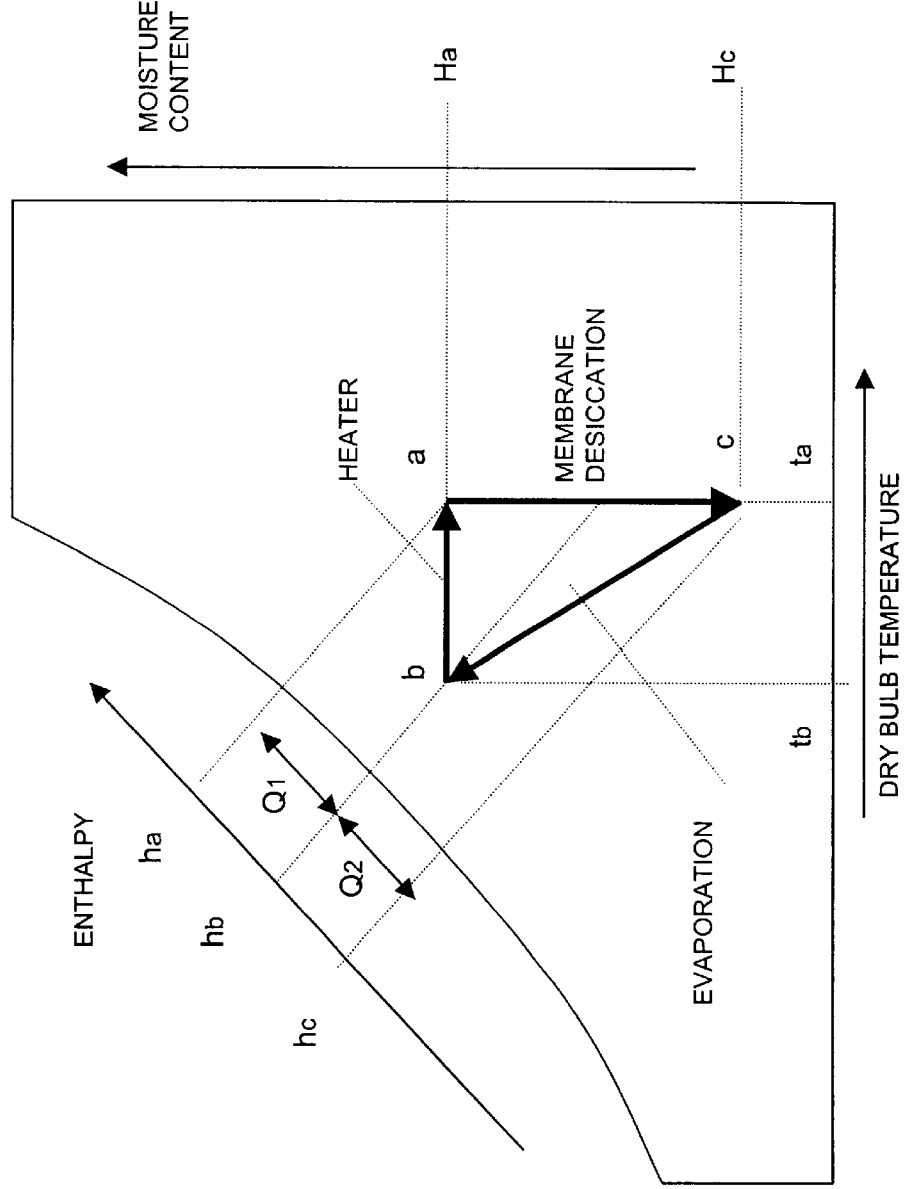
FIG. 20. CLOSED AIR CYCLE SHOWN ON A PSYCHOMETRIC CHART

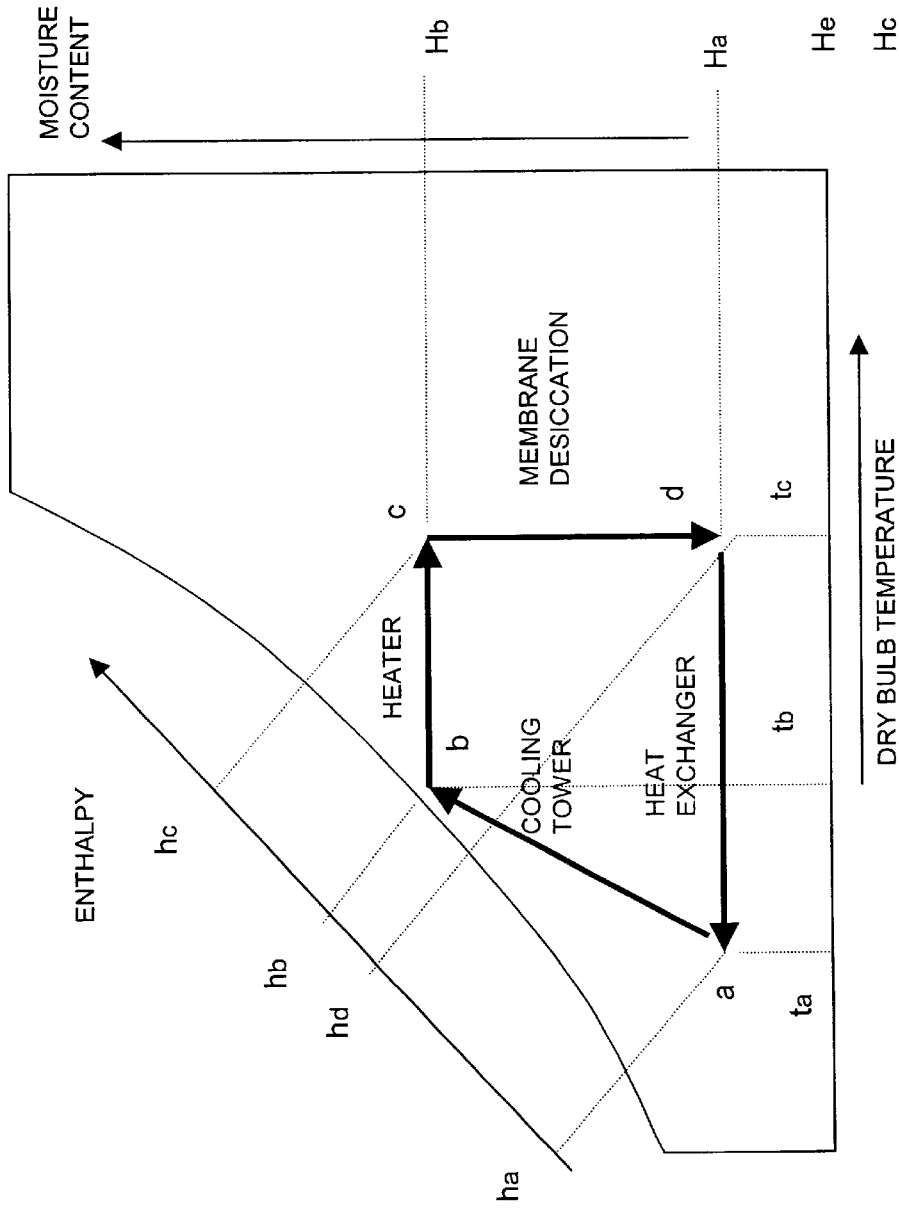
FIG. 21. MEMBRANE HEAT PUMP PROCESS FOR WASTE HEAT RECOVERY SHOWN ON A PSYCHOMETRIC CHART

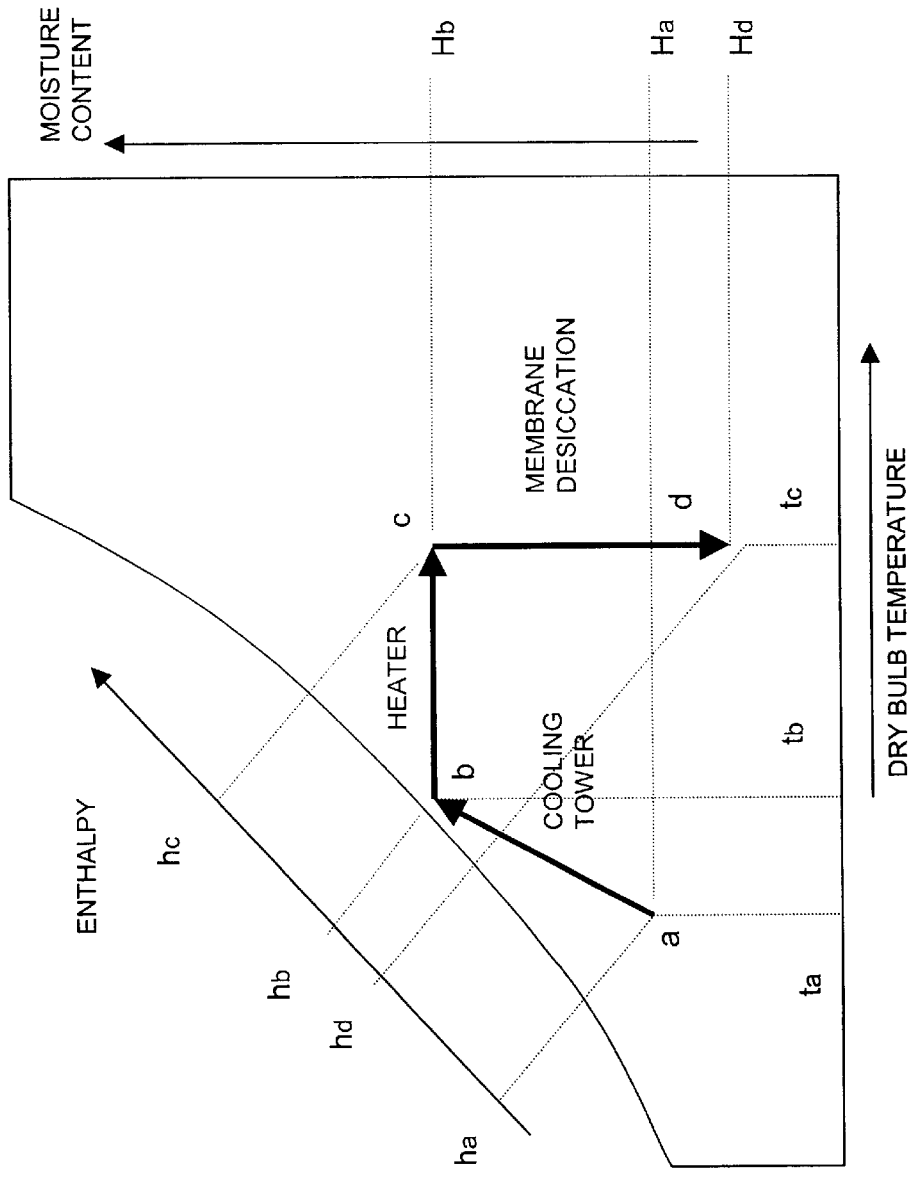
FIG. 22. OPEN CYCLE MEMBRANE HEAT PUMP PROCESS FOR WASTE HEAT RECOVERY SHOWN ON A PSYCHOMETRIC CHART

MEMBRANE DESICCATION HEAT PUMP

CROSS REFERENCE TO RELATED APPLICATIONS

The present application is claiming priority of U.S. Provisional Patent Application Serial No. 60/251,207, which was filed on Dec. 4, 2000, and U.S. Provisional Patent Application Serial No. 60/257,031, which was filed on Dec. 21, 2000.

BACKGROUND OF THE INVENTION

1. Field of the Invention

The present invention relates generally to a transfer of thermal energy, and more particularly, to heat transfer arrangements employing a membrane desiccation heat pump for both heating and cooling applications.

2. Description of the Prior Art

A cooling of a gaseous fluid containing humidity and, in particular, a cooling of humid air, is desired in many circumstances. Cooling of ambient atmosphere is often desired in buildings, domestic dwellings, in appliances such as refrigerators, and in storage rooms and the like. It is also desired in delivery vehicles and trucks, and in aircraft and marine craft. Other applications are natural gas cooling for removal of natural gas liquids or providing of controlled inert atmosphere to industrial processes such as paint drying, food drying and clean rooms.

Cooling systems using water vapor as working fluid are among the oldest in the art of producing cold. Early processes made use of principles of both compression and adsorption refrigeration, the latter using sulfuric acid as an absorbent. Vacuum refrigeration systems using water vapor or organic vapor as a refrigerant and steam injector as a compressor were well adapted to air conditioning application in the 1940s.

Many different proposals have been made for cooling gases and, in particular, for the cooling of air. A popular system in widespread use utilizes a compression and expansion of a heat exchange medium in the form of a gas, which can be compressed into a liquid state, and then is allowed to expand into a vapor state, i.e., the so-called compression/expansion cycle. In most cases, chloro-fluoro carbon gases, e.g., Freon™, were used, but recently such gases have been considered environmentally unsafe. Conventional alternatives to Freon™ are not as efficient as Freon™, and thus systems using the compression-expansion cycle require a relatively large input of power for the compression cycle. As a result, attention has turned to the feasibility of air conditioners that rely on alternative energy sources. Desiccant air conditioning systems are able to utilize alternative sources such as waste heat or solar energy for cooling and air conditioning thereby reducing electric power consumption and reducing reliance upon conventional power sources.

Desiccant air conditioners work as follows. During a cooling mode or adsorption cycle, hot humid air enters an intake side of an air conditioning system and passes through one side of a slowly turning desiccant wheel or circular desiccant bed. Water vapor and other moisture vapor are adsorbed on an extended desiccant material surface area, drying the air and releasing latent heat of condensation. Hot dry air from the desiccant bed wheel then passes through a heat exchanger such as an air-to-air heat exchanger wheel giving up some of the heat to an exhaust air stream. The air is then reconditioned to be in a desired comfort zone by passing through an evaporative element or unit where moisture is evaporated back into the air, for example by spraying, cooling the air to a desired temperature and humidifying the air to a desired relative humidity.

Open cycle desiccant systems have been known from the early 1940's. In 1955, U.S. Pat. No. 2,700,537 to Pennington described using rotary heat exchangers impregnated with desiccants. Today dual path machines still use the Pennington cycle. In 1960, U.S. Pat. No. 2,926,502 to Munters improved this cycle. The '502 patent discloses an air conditioning system including the recycling of air, at least three air flow paths, with all embodiments including a recycling of interior space conditioned air path, an open cycle regeneration path and a supplementary air path for an additional heat exchanger.

U.S. Pat. No. 4,594,860 to Coellner et al. discloses an open cycle desiccant air conditioning system in which the regeneration path is an open cycle and very similar to Pennington's cycle. U.S. Pat. No. 2,186,844 to Smith discloses a refrigeration apparatus wherein heat from a mechanical refrigeration unit regenerates desiccant, very similar to concepts described in U.S. Pat. No. 5,502,975 to Brickley et al. and U.S. Pat. No. 5,517,828 to Calton et al. The common factor is the open cycle regeneration path. U.S. Pat. No. 4,786,301 describes an air conditioning system having heat exchanging desiccant bed with alternating adsorption desorption cycles, an improvement of this concept is described in U.S. Pat. No. 5,222,375 entailing the use of two alternating desiccant beds.

U.S. Pat. No. 5,353,606 to Yoho et al. addresses a three-path desiccant air conditioning system. As with other prior art systems, all these regeneration paths are open cycle.

Some of the problems associated with desiccant air conditioners are the need for removal of latent heat of condensation and adsorption from the desiccant bed and desiccant material during the adsorption cycle, the need for thermal energy for the desiccant regeneration cycle and the need to cool the desiccant after the regeneration. Furthermore, desiccant wheel machines are cumbersome to build and require a high level of maintenance.

Several authors have suggested employing a heat pump to raise the temperature of heated fluid for utilization of a waste heat stream. Heat pump systems employed for such processes are based on conventional cycles, i.e., fluid compression, absorption, sorption and desiccation cycles. The use of heat pumps for heat recovery have been shown in several applications utilizing various low level heat sources such as heat emitted by refrigerators (U.S. Pat. Nos. 4,041,724 and 4,226,089), an exhausted air duct (U.S. Pat. Nos. 4,100,763, 4,175,403 and 4,416,121), paper mill processes (U.S. Pat. Nos. 4,026,035, 4,437,316, 4,522,035 and 4,780,967), a power plant (U.S. Pat. No. 4,124,177), solar energy (U.S. Pat. Nos. 4,143,815, 4,332,139 and 4,703,629). Other sources of low level heat are: a plurality of secondary heat sources from an industrial plant or a factory (U.S. Pat. Nos. 4,173,125, 4,307,577, 4,333,515 and 5,548,958.); humid air (U.S. Pat. Nos. 4,197,713 and 4,517,810); air exhausted from a paint spray booth (U.S. Pat. No. 4,197,714); a gas stream of a drying oven (U.S. Pat. No. 4,295,282); a building stack or a flue (U.S. Pat. Nos. 4,314,601 and 4,660,511); waste heat from a gas turbine (U.S. Pat. No. 4,347,711); thermally activated separation processes such as fractional distillation, distillation, dehydration, or acid gas scrubbing (U.S. Pat. Nos. 4,347,711 and 5,600,968); waste water heat (U.S. Pat. No. 4,448,347); fumes from a heating boiler (U.S. Pat. No. 4,523,438); boiling solvent vapor (U.S. Pat. Nos. 4,537,660 and 4,539,816); waste heat heated water (U.S. Pat. No. 4,819,446); waste heat such as absorber heat, hot vapor heat, flue gases, or a combination thereof (U.S. Pat. No. 5,255,528).

A membrane separation method for removing water vapor from a gas is a method wherein a gas containing water vapor is contacted to one side of a vapor permselective membrane assembly, and a dry gas is contacted to the other side of the membrane, so that the water vapor is selectively permeated and separated through the membrane. In principle, it has merits over other three methods such that the running cost is low, the structure of the apparatus is simple, and dry air can continuously be obtained without polluting air. As a vapor permselective membrane excellent in permeability of water vapor, an ion exchange membrane as well as a dehumidifying method using such a membrane has been proposed by U.S. Pat. Nos. 3,735,558 and 4,909,810. Hollow fiber membrane-based dehydration is also known. See, for example, U.S. Pat. Nos. 4,783,201, 4,725,359, 4,718,921, 4,497,640, 4,583,996 and 3,511,031. U.S. Pat. No. 4,900,626 discloses a hollow composite fiber for dehydration having a polydimethylsiloxane coating on a dense layer of the fiber support.

Although membranes have been used in various separation applications, their use for heat pump systems has been limited. U.S. Pat. Nos. 4,152,901 and 5,873,260 propose to improve an absorption heat pump by using a semi-permeable membrane and a pervaporation membrane, respectively. U.S. Pat. No. 4,467,621 proposes to improve vacuum refrigeration by using a sintered metal porous membrane and U.S. Pat. No. 5,946,931 shows a cooling evaporative apparatus using a microporous PTFE membrane.

SUMMARY OF THE INVENTION

It is an object of the present invention to provide a membrane desiccation heat pump system that is useful for various application such as cooling, chilling, heating and air conditioning, and that is low-cost, efficient and simple to maintain.

Another object of the present invention is to provide such a membrane desiccation heat pump system, characterized by an energy economy or efficiency better than that of prior art systems. One important feature of the present invention is that it employs a process carried out without an addition of costly heat energy from outside for separating a sorption agent from a working medium.

Another object of the present invention is to provide a membrane desiccation air conditioning system, which permits a greater degree of independent control of temperature and humidity for achieving parameter levels in desired regions of the comfort zone than prior art systems.

A further object of the present invention is to provide an open system membrane desiccation air conditioner having a broad range of applications and being capable of net introduction of either heat or mechanical energy from an external source and net removal of heat energy relative to the air conditioning system for greater flexibility and control of comfort zone parameters.

Additional objects of the present invention are to provide a membrane desiccation based liquid chilling and heating process systems usable for various applications.

Yet another object of the present invention is to provide a new method of waste or low level energy recovery using a membrane desiccation-based heat pump process adapted to extract unusable thermal energy from a media at low temperature and upgrade it to a higher, useful temperature.

A first embodiment of the present invention is a system for pumping thermal energy. The system includes (a) a membrane permeator for removing vapor from a process gas and for providing a vapor-depleted process gas, and (b) a gas-liquid contactor for adding vapor from a liquid to a the vapor-depleted gas to produce a vapor-added process gas. The system transfers a quantity of thermal energy from the liquid to the vapor-added process gas.

A second embodiment of the present invention is a system for pumping thermal energy including (a) an energy source for heating a vapor-containing gas, and (b) a membrane permeator for removing vapor from the vapor-containing gas and for providing a resultant vapor. The system transfers a quantity of thermal energy from the energy source to the resultant vapor.

A third embodiment of the present invention is a system for pumping thermal energy including (a) a heater for heating a liquid, (b) a gas-liquid contactor for adding vapor from the liquid to a process gas to produce a vapor-containing gas, and (c) a membrane permeator for removing the vapor from the vapor-containing gas and for providing a resultant vapor. The system transfers a quantity of thermal energy from the heater to the resultant vapor.

The present invention also contemplates methods for employing the systems described herein.

A first method for pumping a quantity of thermal energy includes the steps of (a) adding vapor from a liquid to a process gas, thus yielding a vapor-containing gas, and (b) employing a membrane permeator to remove the vapor from the vapor-containing gas, thus providing a resultant vapor. The quantity of thermal energy is transferred from the liquid to the resultant vapor.

A second method for pumping a quantity of thermal energy includes the steps of (a) employing a heater to heat a vapor-containing gas, and (b) employing a membrane permeator to remove vapor from the vapor-containing gas, thus providing a resultant vapor. The quantity of thermal energy is transferred from the heater to the resultant vapor.

A third method for pumping a quantity of thermal energy includes the steps of (a) employing a heater to heat a liquid, (b) adding vapor from the liquid to a process gas to produce a vapor-containing gas, and (c) employing a membrane permeator to remove the vapor from the vapor-containing gas, thus providing a resultant vapor. The quantity of thermal energy is transferred from the heater to the resultant vapor.

A fourth method for pumping thermal energy includes the steps of (a) removing vapor from a process gas with a membrane permeator to yield a vapor-depleted gas, and adding vapor from a liquid to a the vapor-depleted gas via a gas-liquid contactor to yield a vapor-added gas. The method transfers a quantity of thermal energy from the liquid to the vapor-added gas.

The present invention involves a membrane desiccation heat pump for use in association with a gaseous flow system adapted to move a gaseous process fluid, such as air, containing a quantity of moisture vapor content. In a preferred embodiment, the cooling system includes (a) humidification means, e.g., a gas-liquid contactor, operable to add vapor of a vaporizable liquid fluid to a process gaseous fluid, (b) a moisture vapor membrane permeator, (c) means for passing the process fluid through the membrane permeator to dry the process fluid and substantially reduce the quantity of moisture vapor in the process fluid, thereby separating the vapor from the gaseous process fluid and (d) vapor removal means for removing the concentrated vapor from the from the membrane permeator. An evaporation process utilizes heat from one of the fluids or from both for the latent heat of vaporization of the liquid, to reduce the temperature thereof and simultaneously establish a desirable humidity level in such gaseous process fluid.

One feature and advantage of the present invention is that the membrane desiccation heat pump permits a substantial import of energy from an external source, such as an alternative or low level energy source, into the system, and a substantial removal of heat energy from the system. Thus, the present invention provides a very efficient heat pump both for the purpose of either cooling or heating.

The liquid-gas contactor facilitates mass transfer of liquid vapor from a liquid into a gas while simultaneously removing latent heat from the liquid and thereby reducing the temperature of both. It also acts as a direct-contact heat exchanger that enables a heat transfer from a fluid that has to be cooled to a circulating fluid. It may be any unit that operates on a principle common in the industry such as spray or atomizing, dripping, sprinkler, wet pad, packed column, plates column, baffle tower or any type of cooling tower. It could also be a membrane contactor having any of the configurations described above for the membrane permeator assembly, however, in this case, it would enable the evaporation from the liquid to the gas phase. Other possible embodiments for such a contactor include a humidifier or any type of evaporator, for example, a short tube evaporator or a long tube evaporator, or a flash evaporator.

A membrane separator removes vapor from a stream of carrier gas. The removal of the vapor from the gas stream is also involves a removal of the latent heat contained in the vapor, thus providing a thermodynamic vehicle for a heat pump.

For use in the present invention, a membrane separator assembly is preferably capable of an efficient and economical separation of vapor from the carrier gas. Such a membrane separator assembly may come in different shapes and forms. The following paragraphs describe several features of the membrane assembly that may be used for vapor separation in the present invention:

The membrane separator assembly may include one or more membrane units that could be assembled in any array, such as series, parallel, cascade or in a membrane column. A membrane unit may be either a self-contained module or a combination of one or more membrane elements in a housing. A membrane element can be any form of packaging of membrane area in a single item such as but not limited to a module, a cartridge, a plate, etc.

The membrane can be solid or liquid, organic or inorganic, pre-made or dynamic, charged or uncharged, ionic or non-ionic, hydrophilic or hydrophobic, porous or dense, permeable, non-permeable or semi permeable. It can be polymeric, metallic, ceramic, carbon or glass. Membrane geometry can be in any form such as a flat sheet, tubular, capillaries, hollow fibers or a monolith. A membrane element can be in any configuration such as hollow fiber module, hollow fiber plates, spiral wound module, plate and frame, pleated or folded cartridge, envelopes, bags, tubes and sheets, spiral tubes, candles or monolithic.

Flow patterns of either a feed-retentate side or a permeate side of the membrane in the membrane unit may be countercurrent, co-current or both. It could be transverse flow, diagonal flow or random direction flow. It could be unidirectional or multi directional. It could be one pass or multi pass. Either flow could be on any side of the membrane in the element configurations detailed above.

Removal of the permeating vapor from the membrane unit may be direct or it could be facilitated by means such as reflux flow, either internal or external, vacuum and/or condensation. It could be a sweep stream that may be of gas or liquid. Such a sweep stream may be inert or reactive, i.e., having either physical or chemical affinity toward the permeating vapor.

A good membrane process for vapor separation from gas especially dehydration must be capable of removing water vapor from the feed gas to the desired dew point. Preferably, the water vapor separation takes place with as little loss of feed gas to the permeate as possible and the process must economically perform this separation; in other words, the membrane surface area required to perform a given water vapor separation should be as small as possible.

Vapor permeates through a membrane from a feed side of the membrane to a permeate side of the membrane. A driving force for a transport of vapor through the membrane is a partial pressure differential of the vapor across the membrane. Therefore, a partial pressure of water vapor in a gas leaving as permeate from a membrane module cannot exceed a partial pressure of water vapor in a feed gas entering the membrane module. In most cases, the partial pressure of water in a gas at saturation is very low. Therefore, the partial pressure driving force for the vapor transport must be provided by one of three methods: (1) a sweep method, in which dry gas from an external source is swept proximate to the permeate side of the membrane; (2) a vacuum method, in which a vacuum is applied to the permeate side of the membrane; or (3) a dilution method, in which (a) the permeate is left at, for example, atmospheric pressure, but either a small percentage of the feed gas is allowed to permeate the membrane, diluting the water vapor content of the permeate, or (b) reflux of a part of the dry retentate into the permeate compartment. In all three cases, the driving force for the permeation of the vapor in the feed gas is provided by the vapor partial pressure difference between the feed and the permeate.

The membrane desiccation heat pump can be constructed in several configurations. It may be either an open cycle or closed cycle gas system, and it may be either an open cycle or closed cycle liquid system. The system may be operated either in a cooling mode or in a heating mode. It may also determine both the temperature and the vapor content of the out put gas. Specifically, the membrane desiccation heat pump may serve as a very efficient air condition system both for large and small sizes, and it may be an excellent system for providing chilling water for various applications.

As in any heat pump, the laws of thermodynamics govern the membrane desiccation heat pump. It removes heat from a media at a low temperature and transfers it to a higher temperature by investing external energy into the process. Commonly, a compression heat pump requires mechanical energy input, and an absorption heat pump requires thermal energy input to facilitate the thermodynamic process. A membrane desiccation heat pump can utilize either form of energy input or both together.

BRIEF DESCRIPTION OF THE DRAWINGS

FIG. 1 is a conceptual diagram of a membrane desiccation heat pump system in accordance with the present invention.

FIGS. 2A–2C are conceptual diagrams of several possible flow modes of permeate in a membrane permeator.

FIGS. 3A–3C are conceptual diagrams of several possible arrangements for removal of permeate from a membrane permeator.

FIG. 4 is a conceptual diagram of a totally open cycle gas chilling system.

FIG. 5 is a conceptual diagram of an open cycle gas chilling/air conditioning system.

FIG. 6 is a conceptual diagram of a liquid chilling—open cycle system.

FIG. 7 is a conceptual diagram of a gas chilling—closed cycle system.

FIG. 8 is a conceptual diagram of a closed cycle liquid chilling system.

FIG. 9 is a conceptual diagram of gas chilling/air conditioning and vapor content control system.

FIG. 10 is a conceptual diagram of an open cycle liquid chilling system with a permeate vacuum pump.

FIG. 11 is a conceptual diagram of a liquid chilling system with a permeate reflux dilution.

FIG. 12 is a conceptual diagram of a gas chilling/air conditioning and vapor content control system.

FIG. 13 is a conceptual diagram of a membrane heat pump in a heating mode.

FIG. 14 is a conceptual diagram of a membrane heat pump in a heating mode with a liquid side heater.

FIG. 15 is a conceptual diagram of a membrane heat pump used for recovery of heat from a cooling tower.

FIG. 16 is a detailed conceptual diagram of an open cycle membrane heat pump used for recovery of heat from a cooling tower.

FIG. 17 is a graph of heat pump coefficient of performance as function of heat rejection temperature.

FIG. 18 is a graph of heat pump coefficient of performance as function of heat source temperature.

FIG. 19 is a psychometric chart of a thermodynamic cycle of a membrane air conditioning system.

FIG. 20 is a psychometric chart of a thermodynamic cycle of a membrane heat pump.

FIG. 21 is a psychometric chart of a thermodynamic cycle of a membrane heat pump for recovering heat from a cooling tower.

FIG. 22 is a psychometric chart of a thermodynamic open cycle of a membrane heat pump for recovering heat from a cooling tower.

DESCRIPTION OF THE INVENTION

Before proceeding with a description of the present invention, it is well to define certain terms as used herein.

A heat pump is a system that utilizes a thermodynamic process that takes thermal energy from a low temperature heat source and releases it at higher temperature utilizing an input of energy from another source.

A membrane is a semi permeable barrier capable of selectively permeating certain constituents of a fluid mixture.

A membrane permeator is a self-contained assembly of membrane packaging, including all required housings and piping components, capable of rendering perm selective separation of a fluid mixture.

Desiccation is a process for removing vapor of one or more liquids out of a gas containing the vapor, resulting in vapor-depleted or dry gas. Usually this is done by an adsorption material such as a zeolite or a silica gel. However, it can be done by absorption for example, absorption of water vapor by sulfuric acid.

A fluid is a substance with no reference configuration of permanent significance, aggregate of matter in which molecules are able to flow past each other without fracture planes forming. Subdivisions of fluids are gases vapors and liquids.

A gaseous fluid is a fluid where its volume is a function of its pressure and its absolute temperature. All gaseous fluids approximately obey the ideal gas equation $pv=nRT$ where p is pressure, v is volume, n is number of moles, R is the gas constant (0.082 liter atm/deg K) and T is absolute temperature.

FIGS. 1–16 are schematic drawings illustrating various exemplary embodiments of the present invention. Auxiliary equipment, such as pumps, valves, heat exchangers and condensers, is not necessarily shown.

FIG. 1 is a conceptual diagram of a membrane desiccation heat pump system 100 in accordance with the present invention. System 100 uses, as operating media, a gas in a gas loop 105 and a condensable fluid in a liquid loop 110. System 100 obtains thermal energy from a warm liquid 7, which is at a first temperature, transfers the energy to a vapor-containing gas 1 and then outputs the energy as a concentrated vapor 125 at a second, higher temperature. The terms "cold, cool, warm and hot", as used herein, are meant to indicate relative temperatures of various media, and not necessarily absolute temperatures of the media.

Vapor-containing gas 1 enters a feed side of a membrane permeator 2 that contains a permselective membrane 3 for selective permeation of vapor from vapor-containing gas 1. The permeation of vapor from vapor-containing gas 1 removes the vapor and energy from vapor-containing gas 1. The energy is output in the form of latent heat contained by concentrated vapor 125, which exits membrane permeator 2 from a permeate side thereof via a permeate exit 4.

Warm dry gas 5 leaves membrane permeator 2 via a retentate side thereof, enters gas-liquid contactor 6 and interacts with, e.g., directly contacts, warm liquid 7, which also enters gas-liquid contactor 6. As a result of the interaction between the two fluids, i.e., warm dry gas 5 and warm liquid 7, evaporation occurs. Flow modes of the fluids in gas-liquid contactor 6 may be counter-current as shown in FIG. 1, or they may be co-current or cross current. Energy for the latent heat of the evaporation is taken from warm liquid 7, resulting in a decrease in the temperature of both fluids, i.e., warm dry gas 5 and warm liquid. Thus, a cold liquid 8 and a cold gas, i.e., vapor-containing gas 1, exit gas-liquid contactor 6 and are respectively recirculated.

A liquid circulation loop may include a liquid reservoir 9 and a circulation pump 10. A gas recirculation loop may include a pumping means 11, such as a blower or a compressor. Optionally, a heat exchanger 19 may be installed to increase the efficiency of the process by transferring thermal energy between warm dry gas 5 and cold liquid 8, by indirect contact therebetween, and more specifically, by precooling warm dry gas 5 before it enters gas-liquid contactor 6.

FIGS. 2A–2C show permeate flow within several alternate embodiments of membrane permeators suitable for use as membrane permeator 2.

FIG. 2A shows a membrane permeator 202A having a mixed permeate flow configuration. Permeate passes through a permselective layer of a permselective membrane 203A and then exits via a permeate exit 204A. All of a gas required to dilute a permeate stream comes from a feed gas. In mixed-flow, the gas, i.e., vapor and gas to be dried, on the permeate side of a given section of the membrane blends with the other gas that permeates other sections of the membrane in such a way that permeation through that section may be calculated according to the average permeate concentration. Such permeate flow typically occurs in spiral wound membrane module, transversal hollow fiber module and some plate and frame module.

FIG. 2B shows a membrane permeator 202B in which permeate flows in a co-current configuration. A permeate concentration is ever increasing as it flows down a permeate channel parallel to a feed side flow, through a permselective membrane 203B, and exits via a permeate exit 204B at a down stream end of membrane permeator 202B.

FIG. 2C shows a membrane permeator 202C in which permeate flows in a counter current configuration, which is usually more favorable than that of either the mixed or co-current configurations. As a more dilute permeate from a down streamside of membrane permeator 202C flows in a counter direction to a feed side flow, it cumulatively blends with permeate from preceding sections to lower their concentration and thereby increase a driving force across a permselective membrane 203C resulting in a higher permeate flux. The dilute permeate exits via permeate exit 204C, which is located at an upstream side of membrane permeator 202C.

FIGS. 3A–3C illustrate several means to facilitate higher permeate flow in a membrane permeator by lowering a vapor concentration on a permeate side of the membrane permeator.

FIG. 3A shows permeate removal by vacuum. This may be done either by a vacuum pumping means 13, which may be, for example, a vacuum pump or a steam injector. A condenser 12, from which a condensate 15 exits, is located between membrane permeator 2 and vacuum pumping means 13. This configuration with condenser 12 substantially reduces pump capacity requirements of vacuum pumping means 13, as vacuum pumping means 13 is used only to remove non-condensable gas. Energy consumption of vacuum pumping means 13 should be taken into account for calculating heat pump efficiency. Generically, condenser 12 is an embodiment of a heat exchanger.

FIG. 3B shows an arrangement for removal of permeate by counter current reflux. A reflux stream 14 of dried gas is drawn from downstream of a retentate outlet of membrane permeator 2 and directed into a permeate channel of membrane permeator 2. An energy investment here is in a form of compression energy invested in reflux stream 14. Condenser 12 is used when the gas has to be recovered or when the condensation is to be used.

FIG. 3C shows an arrangement for dilution of a permeate stream by means of sweeping, using a sweep stream 18 that may be either a liquid or a gas. Optionally, a separator 16, which may be a condenser, from which a stream of condensate 15 and a stream of a liquid-depleted sweeper 17 would exit, if the sweep fluid were a gas. If sweep stream 18 is a liquid of other chemical composition than the vapor from membrane permeator 2, separator 16 may be any appropriate equipment capable of separating the condensate of the vapor from membrane permeator 2 from the liquid sweep stream 18, such as by extraction crystallization or distillation.

An overall effect of operation of a heat pump system such as that shown in FIG. 1 is to reduce the temperatures of the circulating fluids. However, as will be disclosed in greater detail below, the combined employment of membrane desiccation and evaporation in the manner indicated herein yields a more efficient heat pump than the desiccant heat pumps described in the prior art, which include adsorption desiccation using adsorbent materials such as zeolites.

Vapor desiccation by either solid or liquid desiccants is an exothermic process that requires substantial means for removing thermal energy emitted during the adsorption process owing to the operation cost required for removing the emitted energy, the investment in equipment dedicated for this purpose and the complexity of such systems. Furthermore, the desiccants have to be regenerated. Such regeneration typically requires either a pulsating operation or a use of a desiccation wheel, which is cumbersome to construct, operate and maintain.

In addition to having a more efficient separation of vapor from gas, compared to desiccant based processes, the system of FIG. 1 offers a number of other advantages over prior art systems, including a heat pump having a higher efficiency with lower equipment cost, a reduced likelihood of maintenance problems with the lower operation cost, a capability for use with simple equipment due to the lack of need for adsorbent regeneration. The same is true if the heat pump process is compared to either absorption or compression expansion refrigeration cycles; there is no need for expensive pressure-piping and fittings, compressors and other component that render such systems expensive especially when large volume of fluids are involved. Compared to such systems membrane heat pump would operate at relatively low pressures and will not need special fluids such as Freon™, Halon™ or ammonia. The present invention may employ inexpensive and environmentally friendly and safe to use fluids such as air and water and still operate very efficiently.

FIG. 4 illustrates a system similar to that of FIG. 1 with the exception that both fluids operate in open cycle modes. A warm humid gas stream, i.e., vapor-containing gas 1, enters membrane permeator 2. A dry warm gas, i.e., warm dry gas 5, and warm liquid 7 enter gas-liquid contactor 6, where both warm dry gas 5 and warm liquid 7 consume part of their own combined enthalpy to provide latent heat for liquid evaporation and will exit the system at lower temperatures. The two exit streams are a cold gas 20, which contains liquid vapor, and cold liquid 8.

FIG. 5 illustrates another embodiment of the present invention. The system in FIG. 5 is a gas chilling system that differs from the system in FIG. 1 in that the gas stream operates in an open cycle while liquid circulates in a closed cycle. Warm humid gas, i.e., vapor-containing-gas 1, is pumped from liquid reservoir 9 using circulation pump 10 and enters membrane permeator 2. Warm dry gas 5, and warm liquid 7, which is circulating, enter gas-liquid contactor 6. Cold gas 20 exits the system, while cold liquid 8 flows via heat exchanger 19 and back into liquid reservoir 9. Cold gas 20 may be pumped into an enclosed space 24 that, in a case of an air conditioning process, may be a building. When the system of FIG. 5 is employed for air conditioning, the gas fluid (i.e., vapor-containing gas 1, dry gas, 5 and cold gas 20) is air and the liquid fluid (i.e., warm liquid 7 and cold liquid 8) is water.

The system of FIG. 5 may be utilized for applications in any industrial institutional or residential field where chilled gas is required. One of the most common applications is air-conditioning, which will be discussed further below. Other applications include industrial gas processing or natural gas treatment maintenance of a cool inert gas environment such as that employed in food, produce and pharmaceutical industries.

FIG. 6 illustrates a heat pump system similar to that of FIG. 1 with the exception that the liquid operates in an open cycle mode, and the gas loop circulates in a closed cycle. A gas stream is circulated in a closed loop by pumping means 11. Vapor-containing gas 1 enters membrane permeator 2. Warm dry gas 5 and warm liquid 7 enter gas-liquid contactor 6. Cold gas 20 exits gas-liquid contactor 6 and is recycled as vapor-containing gas 1 into membrane contactor 2, via heat exchanger 19, thus pre-cooling incoming warm liquid 7. Cold liquid 8 flows out of the system.

The system of FIG. 6 may be utilized for applications in any industrial institutional or residential field where chilled water is required. For example, the system may be employed to provide chilled water for food processing and dairy, chilling cooling water for plastic fabrication machinery, chilling condenser-cooling water, and cold water for building cooling systems.

FIG. 7 illustrates an embodiment of the present invention similar to that of FIG. 1, but differs from FIG. 1 in that an additional heat exchanger 21 is installed on the gas closed-loop. A heat transfer-fluid enters heat exchanger 21 as a warm or hot fluid 22, exits heat exchanger 21 as a chilled fluid 23 and circulates to an end-user.

FIG. 8 illustrates a system similar to that of FIG. 7, but differs by having heat exchanger 21 installed on the liquid circulating closed loop. Both embodiments shown in FIGS. 7 and 8 advantageously can be used with a suitable pair of liquid/gas fluids and can be operated at optimal conditions in enclosed modes without a need for direct contact of the process fluids with an end-user. Also, having an enclosed condition avoids fouling of the system components by constituents of the fluid, which may otherwise occur in an open cycle system.

FIG. 9 illustrates an open cycle gas cooling system with an ability to control vapor content of an outlet gas. This embodiment is similar to that of FIG. 5, but differs in that cold gas 20, which exits gas-liquid contactor 6 with a high level of humidity, enters a second membrane permeator 25 where the humidity is reduced to a desired level by permeating the vapor through the a membrane 26. A dry cold gas 27 exits the system and may be delivered to an end-user.

Using a dual permeator system as that shown in FIG. 9 enables a higher thermodynamic efficiency since the overall load of moisture circulating in and out of enclosed space 24 is substantially lower than that achieved in FIG. 5; therefore, reducing the separation requirement of permeator 2. Such employment of a membrane desiccation heat pump is very suitable for air conditioning as it provides both an efficient cooling of air and an ability to maintain moisture at a comfort level. For air conditioning, air, i.e., dry cold gas 27, is delivered to a building, i.e., enclosed space 24, and the feed air, i.e., vapor-containing gas 1, is drawn from an inner space of the building.

FIGS. 10 and 11 show two embodiments of a liquid chilling system that are embellishments of the embodiment shown in FIG. 6. The systems of FIGS. 10 and 11 receive warm liquid 7 and provide cold liquid 8 to a consumer.

Dry gas 5 exits from a retentate outlet of membrane permeator 2 and passes through a cooling heat exchanger 29, which may be either air cooled or water cooled, and enters gas-liquid contactor 6 where evaporative cooling occurs. Cold gas 20 and warm liquid 7 are each routed through heat exchanger 19, and produce a precooled liquid stream into gas-liquid contactor 6.

Optionally, the systems in FIGS. 10 and 11 may include a heater 28 that receives a gas stream from heat exchanger 19. Heater 28 may use heat from a low level heat source, waste heat or any other convenient heat source. There are three reason for this heating. The first reason is to elevate the temperature of the gas stream from heat exchanger 19 to increase the thermodynamic efficiency of the heat pump. The second reason is to increase the permeability of permselective membrane 3, which is temperature dependent. The third reason is to enable membrane permeator 2 to operate at a high vapor pressure. Operating at a high vapor pressure increases the driving force of vapor through the permselective membrane 3, elevates the dew point of the permeating vapor and thereby reduces the energy required for permeate removal means, i.e., higher level of vacuum or less reflux.

Another energy input is via pumping means 11, e.g., a blower, which increases pressure and temperature of vapor-containing gas 1 because of gas compression. Pumping means 11 thus elevates the pressure at the feed side of the membrane permeator 2 and improves the membrane separation, which is very dependent on a ratio between feed and permeate pressures.

Options for permeate removal are shown vacuum pumping means 13 in FIG. 10 and as reflux stream 14 in FIG. 11. Either the power of vacuum pump means 13 or the pressure energy loss of reflux stream 14 is included in the energy consumption of the heat pump. One should realize that there is no need for all of these energy inputs and each one of them alone would render an efficient system. The systems in FIGS. 10 and 11 may be constructed with heater 28 or may rely only on pumping means 11 as its source of energy. However, having heater 28 will also prevent condensation of vapor in the gas loop due to the gas compression. Optional cooling heat exchanger 29 may pre cool gas 5 before entering contactor 6. These systems may vent part of, or the entire volume of, gas used for the membrane separation via a vent 31. They may also recycle part of, or the entire volume of, gas used for this purpose via a port 30 back into the gas loop. A gas make-up port 32 enables compensation for gas lost in the membrane separation.

FIG. 12 illustrates a system in which low level waste heat is used for air conditioning. Generally, the membrane desiccation heat pump of the present invention can utilize any source of thermal or mechanical energy to render an efficient operation. The system in FIG. 12 is an extension of the embodiment of FIG. 9.

In FIG. 12, heater 28 uses waste heat to heat vapor-containing gas 1 from a building, i.e., enclosed space 24. Gas make-up port 32 is used for supplying the system with fresh air. Both membrane permeators 2 and 25 use reflux streams 14 to efficiate vapor permeation, and both vent water vapor permeate streams through their respective permeate exits 4 to the atmosphere via vents 31. A retentate stream, i.e., warm dry gas 5, coming out of the membrane permeator 2 is brought back to ambient temperature by cooling heat exchanger 29 using cooling water, and is then precooled by heat exchanger 19 before it enters gas-liquid contactor 6.

FIG. 13 illustrates an embodiment of a membrane desiccation heat pump operating in a heating mode. Generally, this heat pump will take in low-level heat that can be provided at low-temperature. Exemplary sources of low-level heat include waste heat, solar heat, geothermal heat or heat from a low-temperature heat sink.

In FIG. 13, the low-level heat is taken in the form of a stream 34 that contains waste heat at temperature T2. Heat in an amount of Q2 is taken into the closed liquid cycle from stream 34 using a heat exchanger 33. This heat is conveyed to the gas stream as the latent heat of the liquid vapor through gas-liquid contactor 6. The humid gas stream receives an additional amount of heat Q1 at heater 28 that operates at temperature T1 and heats vapor-containing gas 20. The vapor is separated from the gas at membrane permeator 2 and releases its latent heat through condenser 12 at temperature T0, which is substantially higher than T2. Heat Q0 is released at condenser 12, where released thermal energy $Q0=(Q1+Q2)$, such that temperature T0 is delivered to an end-user by a heat conveying fluid stream 35.

In FIG. 13, as well as in any of the embodiment of the present invention, gas-liquid contactor 6 may be an evaporator of any kind, for example, a cooling tower, a packed column, a distillation column or any other type of unit operation equipment used for such purpose. Heater 28 may be of any type and may utilize steam, hot water, fuel or gas burning, electrical, geothermal or solar, or any other heat source that raises the temperature of the gas vapor stream to a desired temperature. As shown in FIG. 13, liquid condensate 15 from condenser 12 may be pumped into liquid reservoir 9 and reflux stream 14 may be pumped back into the gas loop. Any of the configurations given in FIGS. 2 and 3 may be used for membrane permeator 2.

Referring again to FIG. 12, note that the system of FIG. 12 may also operate in a heating mode. To enable the heating mode, no cooling water passes through cooling heat exchanger 29 and the permeate streams from permeate exits 4 are routed to condensers from which condensate flows back to liquid reservoir 9, in a manner similar to that shown in FIG. 13.

Any of the membrane heat pumps of the present invention may be employed in a heating mode or a cooling mode. For example, to configure the system shown in FIG. 13 for a cooling mode, chilled fluid will be delivered to the end-user from heat exchanger 33 via a fluid stream 36. Condenser 12 is cooled by ambient temperature cooling water. Waste-heat may be used for heater 28. Thus, in this mode the heat pump takes energy Q2 from stream 34, adds to it waste energy Q1 at heater 28, and emits to the environment energy Q0=Q1+Q2.

FIG. 14 shows another embodiment of a membrane heat pump in a heating mode. FIG. 14 differs from FIG. 13 by having heater 28 installed on the liquid loop. The waste heat may be delivered to the system via either of heat exchanger 33 or heat exchanger 29, or via both heat exchanger 33 and heat exchanger 29.

FIG. 15 shows an embodiment of a membrane desiccation heat pump used for recovering of waste heat from a cooling tower. This embodiment differs from the embodiment of FIG. 13 by having a cooling tower 135 in the role gas-liquid contactor 6. Cooling tower 135 may of any type but is preferably an induced air or forced air type. Waste heat Q2 is delivered to the system via warm water, i.e., warm liquid 7 at temperature T2. If waste heat Q2 from warm liquid 7 is not captured, then energy contained therein is lost as cooling tower 135 releases vapor to the open atmosphere. The amount of energy that is released to the environment from cooling towers is huge, but it is not ordinarily useful because temperature T2 is relatively low and cannot be used for most applications. However, in FIG. 15, cooling tower 135 cools warm liquid 7 and transfers waste heat Q2 to the air stream through the latent heat of the water vapor.

In FIG. 15, the vapor saturated air that comes out of cooling tower 135 is heated in heater 28, which utilizes a heat source that provides a temperature Ti and inserts the heat amount Q1 into the air vapor mixture. The vapor is permeated at membrane permeator 2, exits membrane permeator 2 as a concentrated vapor stream, and enters condenser 12 where useful heat Q0=Q1+Q2 is released at a desired high temperature T0 and is delivered to an end-user by heat conveying fluid stream 35. Such a process may be operated as a closed cycle as shown in FIG. 15 or as an open cycle as shown in FIG. 16.

The thermodynamic a thermally driven heat pump may be presented by the equation $$Q2/Q1 = T2(T2-T0)/T1(T0-T2)$$

where T represents absolute temperature and subscripts 1,2 and 0 refer to the heat source, the absorbed heat and the rejected heat, respectively. The Ratio Q2/Q1, which indicates the refrigeration effect per unit of energy input, is known as Coefficient of Performance or COP.

FIGS. 17 and 18 are graphs that show a calculated Coefficient of Performance of a membrane heat pump as a function of a heat source absolute temperature $T_1$, an absorbed heat temperature $T_2$, and a rejected heat temperature $T_0$, where the efficiency is given as a ratio $Q_1/Q_2$, where $Q_1$ is a driving heat invested in the process, $Q_2$ is the absorbed heat, and the sum $Q_1+Q_2$ equals the rejected heat.

FIG. 19 is a psychometric chart of a thermodynamic cycle of a membrane air conditioning system, e.g., FIG. 5. Point "a" corresponds to the entry of the membrane permeator. The air undergoes membrane desiccation along pass a-c and its humidity is reduced from Ha to Hc. Pass c-d is precooling in the heat exchanger at constant humidity Hc. Pass d-b is adiabatic evaporative cooling in the gas-liquid contactor at constant enthalpy hb. From point b the air goes back to the end-user. Pass b-e represents the additional desiccation by a second membrane contactor, e.g., FIG. 9. Humidity is reduced and the enthalpy of the air is also reduced, resulting in greater comfort.

FIG. 20 is a psychometric chart of a thermodynamic cycle of a membrane heat pump as shown in FIG. 13. Point "a" corresponds to the entry of the membrane permeator. The air undergoes membrane desiccation along pass a-c and its humidity is reduced from Ha to Hc. Enthalpy is reduced from ha to hc. An amount of heat Q0=ha-hc is carried through the membrane in the form of latent heat and is released to an end-user via condenser 12. Pass c-b is an evaporation in the gas-liquid contactor while the enthalpy increases from hc to hb. In this pass the waste heat that is contained in the liquid is conveyed to the gas in the form of vapor latent heat. Pass b-a is heating in heater 28 at constant moisture content Hb. It raises the temperature of the vapor gas mixture to temperature ta. Then the gas flows back into the membrane contactor via pumping means 11.

The following calculation example demonstrates the process:

Along pass c-b (FIG. 20), air goes into gas-liquid contactor 6 at: Tc=158° F. (70° C. or T0=343° K.), Hc=0.022 lb water/lb air, and Hc=66 btu/lb air enthalpy

| Point | Temperature t ° F., t ° C., T ° K | Enthalpy h (btu/lb) | Moisture content H (lb water/lb air) |
|---|---|---|---|
| a Heater's Exit ≈ permeator's Entry | 158, 70, 343 | 96 | 0.050 |
| c permeator's Exit ≈ contactor's Entry | 158, 70, 343 | 66 | 0.022 |
| b contactor's Exit ≈ Heater's Entry | 104, 40, 313 | 83 | 0.050 |

Data were taken from Perry's Chemical Engineer's Handbook, sixth edition, McGraw-Hill Book Company 1984, pp. 12–5.

The heating energy Q1=ha-hb=96−83=13 btu /lb air. The energy released in the form of water vapor enthalpy through the membrane is Q2=hb-hc=83−66=17 btu/lb air.

Calculating the Coefficient of Performance: COP=Q2/Q1=17/13=1.31. Knowing that Q2/Q1=T2(T2-T0)/T1(T0-T2), assuming no thermal losses and solving for T1, one obtains T1=392° K. or 119° C. or 246.2° F.

If a steam heater is to be used it would require steam of 27.9 psia to achieve this performance. Data were taken from Perry's Chemical Engineer's Handbook, sixth edition, McGraw-Hill Book Company 1984, pp. 3–237.

Assuming a membrane heat pump that requires to produce heat Q0=100,000 btu/hour. If Q2/Q1=X and Q0=Q1+Q2 then Q1=Q0/(1+X), and X=1.31 as calculated above. Thus a steam heater will need Q1=100,000/(1+1.31)=43,290 btu/hr.

Since the heat of condensation of the steam used (27.9 psia) is 935 btu/lb, the steam flow rate required is 43,290/935=46.3 lb steam per hour. The total enthalpy released from the air at membrane permeator 2 is Q0=17+13=30 btu/lb air. Therefore the amount of air circulating is 100,000/Q0=100,000/30=3,333 lb air/hr.

The amount of vapor that passes into the air at gas liquid contactor 6 is equal to the change in the moisture content of the air Ha-Hc=0.050-0.022=0.028 lb water/lb air, resulting in 0.028*3,333=93.3 lb water/hr.

The average latent heat of water vapor at between 104° F. and 159° F. is 1,030 btu/lb water. Thus, the amount of energy required to evaporate this water is 93.3*1,030=96,133 btu/hr. Assuming a waste heat comes in as a stream of water at 45° C. (113° F.) and leaves at 40° C. (104° F.) and water heat capacity of 1 btu /lb ° F., then the water flow rate will be 96,133/(113-104)=10,681 lb/hr or 80.9 liter per minute.

FIG. 21 is a psychometric chart of a thermodynamic cycle of a membrane heat pump for recovering heat from a cooling tower, as shown in FIG. 15. FIG. 22 is a psychometric chart of a thermodynamic open cycle of a membrane heat pump for recovering heat from a cooling tower, as shown in FIG. 16. In both FIGS. 21 and 22, one may see that latent heat energy of the vapor is upgraded by having its temperature increased using heater 28 and then released to the end-user by means of membrane permeator 2. In a conventional system, if one would like to recover energy that is transferred to air steam 20 from warm water stream 7 processed in cooling tower 135, and subsequently upgraded by heater 28, without first separation of vapor from air stream 1, it could not be done efficiently due to size of the heat exchanger required. One of the great advantages of the present invention is that by carrying our such separation using membrane permeator 2 the need to handle the entire air stream is eliminated since only the permeate stream has to be processed to recover the latent heat. Therefore the size of condenser 12 is more than one order of magnitude smaller than such heat exchanger.

It should be understood that various alternatives and modifications of the present invention could be devised by those skilled in the art. The present invention is intended to embrace all such alternatives, modifications and variances that fall within the scope of the appended claims.

What is claimed is:

1. A system for pumping thermal energy, comprising:
   a membrane permeator for removing vapor from a process gas and for providing a vapor-depleted process gas; and
   a gas-liquid contactor for adding vapor from a liquid to said vapor-depleted gas to produce a vapor-added process gas,
   wherein said system transfers a quantity of thermal energy from said liquid to said vapor-added process gas.

2. The system of claim 1, wherein said vapor-depleted process gas is routed from said membrane permeator to said gas-liquid contactor such that said process gas circulates in a loop that includes said membrane permeator and said gas-liquid contactor.

3. The system of claim 2, further comprising a pumping means for facilitating circulation of said process gas in said loop.

4. The system of claim 1,
   further comprising a reservoir for supplying said liquid to said gas-liquid contactor,
   wherein said liquid is routed from an output of said gas-liquid contactor to said reservoir such that said liquid circulates in a loop that includes said gas-liquid contactor and said reservoir.

5. The system of claim 4, further comprising a pump for facilitating circulation of said liquid in said loop.

6. The system of claim 1,
   wherein said vapor permeates from a feed side of said membrane permeator to a permeate side of said membrane permeator, and
   wherein said system further comprises an arrangement for increasing a driving force between said feed side and said permeate side.

7. The system of claim 6, wherein said arrangement employs a technique selected from the group consisting of (a) sweeping a dry gas proximate to said permeate side, (b) applying a vacuum to said permeate side, and (c) allowing a portion of said process gas to permeate said membrane.

8. The system of claim 6, wherein said arrangement refluxes a portion of said vapor-depleted process gas into said permeate side.

9. The system of claim 1, wherein said process gas enters said system at a first temperature, and subsequent to being routed through said membrane permeator, said process gas exists said system at a second, colder temperature.

10. The system of claim 1, wherein said liquid enters said system at a first temperature, and subsequent to being routed through said gas-liquid contactor, said liquid exits said system at a second, colder temperature.

11. The system of claim 1, wherein said vapor-added gas is routed to a space for chilling of said space.

12. The system of claim 1,
    wherein said membrane permeator is a first membrane permeator, and
    wherein said system further comprises a second membrane permeator for reducing humidity of said vapor-added process gas.

13. The system of claim 1, further comprising a heat exchanger for transferring energy between said process gas and said liquid, before said liquid enters said gas-liquid contactor and after said process gas exits from said gas-liquid contactor.

14. The system of claim 1, further comprising a heat exchanger for transferring energy between said process gas and said liquid, before said process gas enters said gas-liquid contactor and after said liquid exits said gas-liquid contactor.

15. The system of claim 1, further comprising a heat exchanger through which said process gas is routed for chilling of a media.

16. The system of claim 1, further comprising a heat exchanger through which said liquid is routed from said gas-liquid contactor for chilling of a media.

17. The system of claim 1, wherein said vapor-depleted process gas is routed to a space for chilling of said space.

18. The system of claim 1, wherein said gas-liquid contactor comprises a component selected from the group consisting of (a) cooling tower, (b) a spray contactor, (c) an atomizing contactor, (d) a dripping contactor, (e) a sprinkler contactor, (f) a wet pad contactor, (g) a packed column, (h) a plates column, (i) a baffle tower, (j) a membrane contactor, (k) a humidifier, (l) an evaporator and (m), a flash evaporator.

19. A system for pumping thermal energy, comprising:
an energy source for heating a vapor-containing gas; and
a membrane permeator for removing vapor from said vapor-containing gas and for providing a resultant vapor,
wherein said system transfers a quantity of thermal energy from said energy source to said resultant vapor.

20. The system of claim 19, wherein said energy source comprises a component selected from the group consisting of a compressor and a blower.

21. The system of claim 19, wherein said energy source comprises a heater.

22. The system of claim 21, wherein said heater uses a source of energy selected from the group consisting of (a) waste heat, (b) solar heat, (c) low level heat, (d) a furnace, (e) flue gas, (f) geothermal heat, (g) steam, (h) hot water, (i) burning fuel, (j) burning gas, (k) electrical and (l) geothermal.

23. The system of claim 19, further comprising a heat exchanger through which said resultant vapor is routed for heating a media.

24. The system of claim 19,
wherein said vapor permeates from a feed side of said membrane permeator to a permeate side of said membrane permeator, and
wherein said system further comprises an arrangement for increasing a driving force between said feed side and said permeate side.

25. The system of claim 24, wherein said arrangement employs a technique selected from the group consisting of (a) sweeping a dry gas proximate to said permeate side, (b) applying a vacuum to said permeate side, and (c) allowing a portion of said vapor-containing gas to permeate said membrane.

26. The system of claim 19,
wherein said membrane permeator discharges a retentate gas, and
wherein said arrangement refluxes a portion of said retentate gas into said permeate side.

27. The system of claim 19,
wherein said heater comprises a heat exchanger for transferring heat from a waste heat source to said vapor-containing gas, and
wherein said quantity of thermal energy comprises thermal energy from a source selected from the group consisting of (a) a waste heat, (b) solar heat, (c) low level heat, (d) a furnace, (e) flue gas, (f) geothermal heat, (g) steam, (h) hot water, (i) burning fuel, (j) burning gas, (k) electrical and (l) geothermal.

28. The system of claim 19, further comprising a gas-liquid contactor that adds vapor from a liquid to a process gas to produce said vapor-containing gas.

29. The system of claim 28, wherein said gas-liquid contactor comprises a component selected from the group consisting of (a) cooling tower, (b) a spray contactor, (c) an atomizing contactor, (d) a dripping contactor, (e) a sprinkler contactor, (f) a wet pad contactor, (g) a packed column, (h) a plates column, (i) a baffle tower, (j) a membrane contactor, (k) a humidifier, (l) an evaporator and (m) a flash evaporator.

30. The system of claim 28, wherein said system transfers a quantity of thermal energy from said liquid to said resultant vapor.

31. The system of claim 30, wherein said resultant vapor releases said quantity of thermal energy at a temperature higher than a temperature of said liquid.

32. The system of claim 30, wherein said resultant vapor heats media by condensation in a heat exchanger and releases latent heat.

33. The system of claim 28, further comprising a heat exchanger for transferring energy between said process gas and said liquid, before said liquid enters said gas-liquid contactor and after said process gas exits from said gas-liquid contactor.

34. The system of claim 28, further comprising a heat exchanger for transferring energy between said process gas and said liquid, before said process gas enters said gas-liquid contactor and after said liquid exits from said gas-liquid contactor.

35. The system of claim 28,
wherein said heater is a first heater and said quantity of thermal energy is a first quantity of thermal energy,
wherein said system further comprises a second heater for heating said liquid,
and wherein said system further transfers a second quantity of thermal energy from said heater to said resultant vapor.

36. The system of claim 35,
wherein said second heater comprises a heat exchanger for transferring heat from a waste heat source to said liquid, and
wherein said second quantity of thermal energy comprises thermal energy from said waste heat source.

37. A method for pumping a quantity of thermal energy, comprising:
adding vapor from a liquid to a process gas, thus yielding a vapor-containing gas; and
employing a membrane permeator to remove said vapor from said vapor-containing gas, thus providing a resultant vapor,
wherein said quantity of thermal energy is transferred from said liquid to said resultant vapor.

38. A method for pumping a quantity of thermal energy, comprising:
employing a heater to heat a vapor-containing gas; and
employing a membrane permeator to remove vapor from said vapor-containing gas, thus providing a resultant vapor,
wherein said quantity of thermal energy is transferred from said heater to said resultant vapor.

39. A method for pumping a quantity of thermal energy, comprising:
employing a heater to heat a liquid;
adding vapor from said liquid to a process gas to produce a vapor-containing gas; and
employing a membrane permeator to remove said vapor from said vapor-containing gas, thus providing a resultant vapor,
wherein said quantity of thermal energy is transferred from said heater to said resultant vapor.

40. A method for pumping thermal energy, comprising:
removing vapor from a process gas with a membrane permeator to yield a vapor-depleted gas; and
adding vapor from a liquid to-a said vapor-depleted gas via a gas-liquid contactor to yield a vapor-added gas,
wherein said method transfers a quantity of thermal energy from said liquid to said vapor-added gas.

* * * * *